United States Patent
Pomponio

(12) 
(10) Patent No.: US 10,034,456 B2
(45) Date of Patent: Jul. 31, 2018

(54) HEATABLE PET GARMENTS

(76) Inventor: John H. Pomponio, New York, NY (US)

(*) Notice: Subject to any disclaimer, the term of this patent is extended or adjusted under 35 U.S.C. 154(b) by 0 days.

(21) Appl. No.: 12/386,225

(22) Filed: Apr. 15, 2009

(65) Prior Publication Data
US 2009/0272337 A1    Nov. 5, 2009

Related U.S. Application Data

(60) Provisional application No. 61/124,335, filed on Apr. 16, 2008.

(51) Int. Cl.
*A01K 13/00* (2006.01)
*H05B 3/34* (2006.01)

(52) U.S. Cl.
CPC ............. *A01K 13/006* (2013.01); *H05B 3/34* (2013.01); *H05B 3/342* (2013.01); *H05B 2203/003* (2013.01); *H05B 2203/014* (2013.01); *H05B 2203/036* (2013.01)

(58) Field of Classification Search
CPC ........ A01K 13/006; H05B 3/34; H05B 3/342; H05B 3/36; H05B 2203/036; H05B 3/345; H05B 3/347
USPC ................... 119/850, 858, 859; 219/211, 527
See application file for complete search history.

(56) References Cited

U.S. PATENT DOCUMENTS

| | | |
|---|---|---|
| 3,443,066 A | 5/1969 | Weibel |
| 5,148,002 A * | 9/1992 | Kuo et al. ............... 219/211 |
| 5,302,807 A | 4/1994 | Zhao |
| 5,537,954 A | 7/1996 | Beeghly et al. |
| 5,777,296 A | 7/1998 | Bell |
| 5,996,537 A * | 12/1999 | Caditz ................ 119/850 |
| 6,005,222 A * | 12/1999 | Hicks .................. 219/211 |
| 6,232,880 B1 * | 5/2001 | Anderson et al. ...... 340/573.3 |
| 6,550,471 B2 | 4/2003 | Szymocha et al. |
| 6,584,939 B1 | 7/2003 | Brezinski |
| 6,649,873 B1 | 11/2003 | Cintron, Jr. et al. |
| 7,038,177 B2 | 5/2006 | Rock |
| 2002/0146948 A1 * | 10/2002 | Pillai et al. ................. 441/106 |
| 2005/0167412 A1 | 8/2005 | Anson et al. |
| 2005/0211192 A1 * | 9/2005 | Nilforushan .............. 119/850 |
| 2006/0080756 A1 | 4/2006 | Goldfine |
| 2006/0213895 A1 | 9/2006 | Dennis |
| 2007/0095808 A1 | 5/2007 | Lacy, III |

(Continued)

FOREIGN PATENT DOCUMENTS

DE      4140507 A1 *  4/1993  ............ A01K 13/00

OTHER PUBLICATIONS www.ecplaza.net—Rechargeable Battery Pets Coat Fir Infrared Dog Heated Body Wrap posted Dec. 3, 2007 (printed Jan. 3, 2008).

(Continued)

*Primary Examiner* — Kathleen Iwasaki Alker
*Assistant Examiner* — Danielle A Clerkley
(74) *Attorney, Agent, or Firm* — Dara L. Onofrio, Esq.; Onofrio Law

(57) ABSTRACT

A heatable pet garment comprised of a garment covering the body of an animal with an opening for the head of said animal and at least two openings for the legs of said animal; a heat device within said garment to produce heat to warm said garment; a rechargeable electrical source to power said heat device; a mechanism to recharge said electrical source; and a control unit to turn said electrical source on and off.

14 Claims, 16 Drawing Sheets

(56) References Cited

U.S. PATENT DOCUMENTS

| | | |
|---|---|---|
| 2007/0138006 A1 | 6/2007 | Oakes et al. |
| 2007/0204857 A1 | 9/2007 | Reusche et al. |
| 2007/0230727 A1 | 10/2007 | Sanguino et al. |
| 2007/0257024 A1 | 11/2007 | Deangelis et al. |
| 2007/0266959 A1* | 11/2007 | Brooks .................. 119/720 |
| 2007/0272170 A1* | 11/2007 | Milson et al. ............ 119/850 |
| 2008/0067163 A1 | 3/2008 | Axinte et al. |

OTHER PUBLICATIONS www.youractivepet.com—Dog Coats and Jackets (printed Jan. 3, 2008).

* cited by examiner

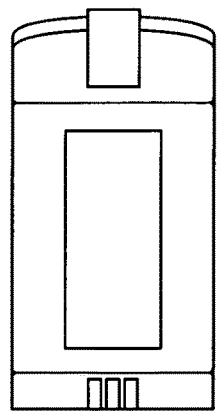 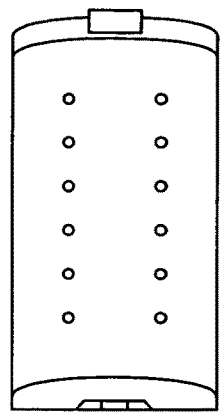 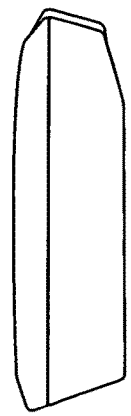
FIG. 5A  FIG. 5B  FIG. 5C
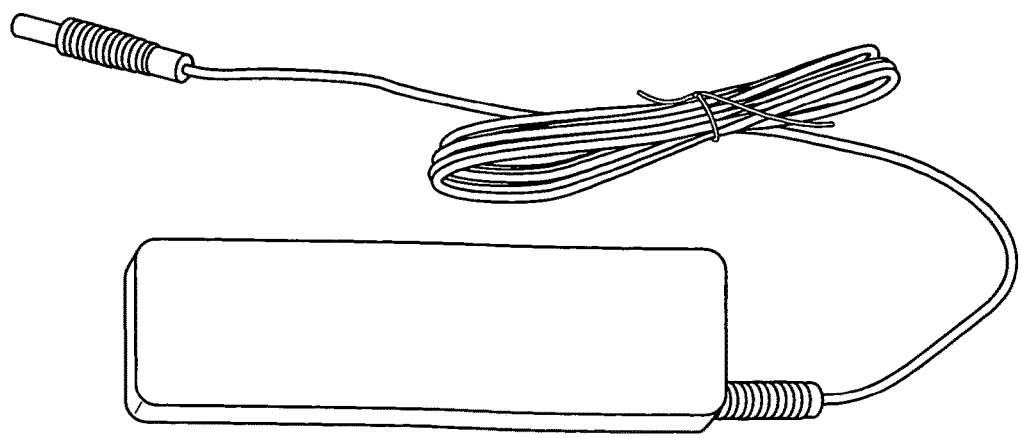
FIG. 6

HEATABLE PET GARMENTS

This application claims the benefit of U.S. provisional application No. 61/124,335 filed Apr. 16, 2008, which is incorporated herein in its entirety by reference.

FIELD OF THE INVENTION

The present invention relates to heatable pet garments. In particular, pet garments heated by solar power, i.e. solar panels and/or solar batteries, although other heat sources such as disposable (primary) and rechargeable (secondary) batteries, thermal, electric and microwave energy are included in the invention.

BACKGROUND OF THE INVENTION

Domestic animals, in particular dogs, suffer in cold weather and can be susceptible to hypothermia. When a dog's internal temperature drops below 96 degrees F. (by being exposed to cold weather for long periods, or getting both wet and cold), there is a serious risk to the dog's safety. Small and short-haired dogs should wear sweaters when taken for walks during cold winter weather. Any sign that a dog is very cold—such as shivering—should signal the owner to bring the dog indoors immediately.

Many types of dogs do not like the cold weather but need to be periodically taken outside for walks, play or just to perform their bodily functions and eliminate their waste. The present invention provides a way for pet owners to help protect their dogs from the cold and make there life more comfortable.

In average winter temperatures most dogs enjoy being outdoors. They need their walks or wide open space to release some of their energy. Many dogs absolutely love to run and play in snow. But some dogs need extra protection from the cold. Unless they have their own cozy fur coats, dogs living in winter climates need outerwear for warmth and comfort on cold windy days. Dogs who shivered on moderately cold fall days will need a warm sweater or coat and lots of encouragement to go outside in harsh winter weather. Exposure to severe cold may cause pain or contribute to frostbite. Dogs with little or no hair on their bellies need a jacket or sweater that covers and warms their entire mid-section. Bassets, doxies and other long-low breeds also need this extra coverage to protect their bellies from contact with ice and snow as well as extra sensitive dogs . . . small Terriers, Chihuahuas, Italian Greyhounds, Chinese Crested Hairless. They all need extra protection when they go outside.

Dog sweaters try to address this problem by providing an extra layer of insulation. However, current dog sweaters are not effective in keeping them warm especially in extreme temperatures. When it is wet outside, such as when it is snowing, a sweater can become soaked immediately causing the animal to be more uncomfortable and colder. They may still feel the bite of cold weather, especially smaller dogs or dogs with a fine coat of fur.

Sometimes nature's coat isn't enough. In cold weather a dog can become uncomfortably, even dangerously, cold when exposed to the elements. The invention overcomes this problem by providing a heatable pet garment designed to keep the animal warm and dry in cold inclement weather. Each garment includes a heat source in electrical communication with a power source for production of heat which is distributed to the desired areas of the garment in physical communication with the body of the animal to keep the pet warm. In a preferred embodiment of the invention the heat source is solar panels or a solar battery pack. Other heat sources such as thermal, electric and microwave energy are included in the invention.

The prior art discloses references relating to heated garments. Representative examples include: U.S. Pat. No. 7,038,177 B2 to Rock discloses electric heating and warming fabric articles; U.S. Pat. No. 6,649,873 B1 to Cintron, Jr. et al. discloses a temperature-controlled heated garment; U.S. Pat. No. 6,550,471 B2 to Szymocha et al. discloses heated clothing for use in cold weather and cold climate regions; U.S. Pat. No. 5,777,296 to Bell discloses an electrically heated garment; U.S. Pat. No. 5,302,807 to Zhao discloses an electrically heated garment with a control for the heating element; U.S. Patent Publication No. 2007/0257024 A1 to Deangelis et al. discloses a calibrated thermal sensing system; U.S. Patent Publication No. 2007/0204857 AI to Reusche et al. discloses a heating system and related method; U.S. Patent Publication No. 2007/00295808 A1 to Lacy III, U.S. Patent Publication No. 2006/02193895 A1 to Dennis and U.S. Patent Publication No. 2006/0080756 A1 to Goldfine disclose an electrically heated clothing article, a heater jacket and heated garment respectively; and U.S. Patent Publication No. 2005/0167412 A1 to Anso et al discloses an electrical garment heating system Solar powered clothing for humans are being developed by Avantex and ScotteVest. The solar-powered clothing prototype by Avantex integrates solar cells in clothing to supply the energy to power small mobile devices as part of the "Solartex" combined research project. The material is said to have "optimized plug connections and with particularly flexible, mechanically stable solar cells, the prototype is able to withstand treatment in domestic washing machines." The ScotteVest is a coat with a solar panel that connects to a power source in one of the pockets.

All these references were directed to heated garments for humans and not for domesticated animals or pets.

Both U.S. Pat. No. 5,537,954 to Beeghly et al. and U.S. Pat. No. 6,584,939 to Brezinski are directed to pet garments and disclose, respectively, a thermally heated pet sweater and a coat for insulation of domesticated animals.

U.S. Pat. No. 5,996,537 to Caditz is directed to an all purpose protective canine coat Col. 2 lines 14-18 states that the second separable fasteners are made of "a sun-absorbing heat containing material for keeping the animal warm." Further Col. 3 lines 50 to 55 states "materials are selected to give a predetermined degree of thermal insulation and solar reflectivity." The animal is kept warm by the material itself used to produce the garment, not by an external heat source.

In addition to the patents and publications discussed above various "heated body wraps" for dogs were found on the internet. Representative sites include:

At www.ecplaza.net a rechargeable battery pet coat and infrared dog heated body wrap was found. The wrap is described as having far infrared (fir) technology throughout, rechargeable battery operated, anti-microbial mesh material and is easy to clean.

At www.youractivepet.com dog coats and jackets in general are described as being fully lined with warm fleece and water repellent outer shell.

Unlike the present invention, the currently known prior art does not disclose a pet garment for dogs which operates via a solar source, i.e. solar panel or a solar battery pack and which can electrically communicate with a heating device, either directly or indirectly, and ultimately provide consistent heat to the garment which is distributed by physical communication to the body of the animal.

None of these products provide a heatable garment for a pet made of a heat device to produce heat, a rechargeable electrical source to power the heat device, a mechanism to recharge the electrical source and a control unit to turn the electrical source on and off.

An advantage of the invention is in the provision of heatable pet garments powered by solar power, i.e. solar panels and/or solar batteries, although other heat sources such as thermal, electric and microwave energy are included in the invention.

A general objective of the invention is to provide consistent additional heat to the animal with consistent temperature to protect form cold weather. The garment provides complete heat distribution as opposed to pockets of heat.

Another object of the invention is to provide insulation. The garment is made of a durable/reliable fabric which will maintain the heat and further insulate the animal from a harsh environment.

Another object of the invention is to provide safety and protection. Reflective panels present on the garment allow others to better recognize the animal in bad weather or darkness.

Yet another object of the invention is to provide free movement. The garment is lightweight and allows for easy dressing of animal and freedom of movement for walking or running.

Another object of the invention is in its ease of use. The garment incorporates the most updated battery or solar technologies to enable the pet owner to operate the garment with simplicity. No electrical cords or pockets to heat up or microwave, no fluids to shake, pads to implant or infrared devices.

Another specific object of the invention is that the batteries are rechargeable. The invention garments heating unit operates using a rechargeable source of electricity, preferably solar or through some lightweight battery that can be charged in a charger. The garment incorporates the latest technology and the easiest and safest rechargeable battery technology.

Nickel-cadmium is the first rechargeable battery in small format and forms a standard against which other chemistries are commonly compared. In addition lithium-based systems offer high-energy density and low weight. If used a protection circuit will be required to limit voltage and current for safety reasons. Although energy density is paramount, other important attributes are service life, load characteristics, maintenance requirements, self-discharge costs and safety.

Another specific object of the invention is to incorporate PV, TFPV or photoelectrochemical technology into the garment. Using Photovoltaic (PV) energy conversion especially Thin Film, Organic and Printable type Photovoltaics (TFPV), the conversion of solar energy to direct current electricity is driven by an array of technology options that can lead to improved performance, increased reliability, and lower cost. TFPV is less expensive because less material is used to produce thin film cells compared to conventional PV. Most importantly, TFPV uses simple printing and roll to roll manufacturing processes. Recent technological improvements have lead to increased efficiency in electrical conversion and heat generation. For example, depositing thin layers of photoelectric material onto a substrate, enables significant reductions in the amount of raw material used. With the emergence of this new manufacturing processes, including roll to roll (R2R) and printing technologies, TFPV will enable even further cost reductions with increased electrical output.

Organic photoelectrochemical, dye-sensitized cells, a new type of solar energy, is expected to be available commercially within the next few months. The technology, which is easy and cheap to use, will be embedded in hundreds of day-to-day consumer products. The dye cells can be used for windows, building facades, gadgets and even in clothing. This new process is potentially more robust than regular photovoltaic panel solutions. Dye based solar cells are made of titanium oxide nanocrystals. These are coated with light absorbing dye that can be used in various materials including glass and plastic. The dye is immersed in an electrolyte solution. When light reaches the surface, the dye sets free electrons which in turn create 'holes'—positive charges as a result of 'lost electrons'. The titanium dioxide semiconducts and transfers electricity to an electrical circuit and energy is created.

Thin film and printed batteries are two related solid state battery types that have smaller form factors than existing liquid electrolyte based button batteries, are potentially low cost, and can fit within existing manufacturing processes. While power densities are not as high as traditional battery types, which is why cell phones are not listed among target applications, NanoMarkets' analysts believe that the unique benefits of thin film and printed batteries position them as energy sources for a variety of next generation, low power, ultra small. Despite their different manufacturing approaches, thin film and printed batteries share several common benefits that are driving their development.

The batteries are very thin with average thicknesses of less than 1 mm

Thin film and printed batteries have long shelf lives and can be reportedly recharged up to 45,000 times.

Long lives and robust rechargeabilty mean these batteries could work with competing energy sources rather than against them, such as storing electricity from energy harvesting devices Thin film batteries using solid state electrolytes have less potential to hurt the environment These batteries can be fabricated in virtually any size or shape on a variety of substrates.

Additional new technologies and other potential energy methods which may be used in the invention device include kinetic energy and the Infinit-e-Stretcher.

Kinetic energy is a device to store energy by just moving; doing sports, exercise, dance or just walking. There currently exists a very simple ankle band (you can also wear it around your arms if that is where you move more) which stores the energy by your movements through this kinetic device. When necessary you plug this charged unit into the garment.

The Infinit-e Stretcher is an ever lasting and ubiquitous source of energy which remains unutilized. It is the flexion that happens in muscles and synthetic materials like straps and belts in our everyday activities that goes unutilized. The concept uses principle of piezoelectricity to harness energy from these everyday and all time activities like breathing, walking and does so without needing a conscious effort from the user.

The most promising example can be of an activity like breathing, which anyone does all the time, produces expansion and relaxation of torso, especially of abdominal region of the person, where we normally wear belt. This expansion and contraction induces alternate stresses in the belt which can be utilized to produce electricity, by using principle of piezoelectricity. Similarly, 'Infinit-e' can be used in other scenarios like exercising:

One can cling it on to pet garment and use deflections during breathing to generate energy for any of the electronic device One can cling it onto straps of pet garment to harness oscillations during walking to charge your gadgets It can be used to cling on anything that is undergoing alternate tension and relaxation to generate electricity. Thus, it has infinite possibilities of generating energy.

Yet another object of the invention is to provide a device that eliminates the dependency on localized charging points and allows charging the pet garments battery while the user is on the move.

This results in enormous savings in energy and materials used for making these components like chargers and batteries and elimination of their harmful impacts on environment.

Another object of the invention is to provide self powered twist devices to power the garment and generate heat energy. Inspired by other contemporary self powered devices such as radios and lamps, we could create a pet garment that uses a winding mechanism for power. The self winding mechanism is also intended to highlight how this latest technology can live in a more harmonious way with us in our society and hopefully make people aware that energy does not just only come from a power point.

SUMMARY OF THE INVENTION

In the present invention, these purposes, as well as others which will be apparent, are achieved generally by providing a self-contained heatable pet garment comprised of a garment covering the body of an animal with an opening for the head of the animal and at least two openings for the legs of the animal, preferably the front legs. A heat device is within the garment to produce heat to warm the garment which is in physical communication with the body of an animal. The heat device is in electrical communication with a rechargeable electrical source to power the heat device; a mechanism to recharge the electrical source; and a control unit to turn the electrical source on and off, and if desired adjust the temperature.

The mechanism used in the invention is preferably a solar panel on the garment itself. Other mechanisms are also included such as a solar charger unit outside of the garment or a plug-in wall charger outside of the garment. In all embodiments, the mechanism recharges the battery used to power the invention device.

The heat device is selected from the group consisting of carbon heating pads, pads with resistance wire and pads with carbon fiber wire.

The rechargeable electrical source is preferably a Li-ion battery pack which stores surplus power generated for selective use. Other electrical sources can be used in the invention and include rechargeable A, B, C or D type cell battery; photoelectrochemical means selected from the group consisting of photovoltaic (PV), thin film organic and printable type photovoltaics (TFPV), organic photoelectrochemical, dye sensitized cells; kinetic energy, Infinit-e Stretcher and self powered twist devices.

The heatable pet garment preferably comprises an outer shell layer, a middle insulation layer and an inner fabric layer, wherein the inner fabric layer is in physical contact with the body of the animal. The insulation layer helps distribute the heat throughout the garment and keep the animal warm.

In a preferred embodiment a one-piece self contained heatable garment is made of a rechargeable battery; a solar panel in electrical communication with the battery which is capable of recharging the battery; a heated device in electrical communication with the battery and in physical communication with the garment to produce heat to warm the garment; and a control unit in electrical communication with the battery. The rechargeable battery is preferably a lithium polymer battery and the solar panel is located on the garment itself. The heated device is selected from the group consisting of carbon heating pads, pads with resistance wire and pads with carbon fiber wire.

Electrical communication is meant to mean that the components used in the invention are connected via wiring so as to communicate with each other and to activate when desired.

Physical communication is meant to mean that the components used in the invention are located inside the garment itself. Specifically, the heat device is located inside the garment and transfers heat and warmth directly to the body of the animal.

The invention also includes a method to keep a pet warm comprising the steps of: providing a heatable pet garment comprised of a garment covering the body of the pet with openings for the head and at least two legs of the pet; a heat device within the garment; a rechargeable electrical source to power said heat device; a mechanism to recharge said electrical source; and a control unit to turn said electrical source on and off. Once the control unit is turned on the device produces heat to warm the garment that is distributed throughout the garment to keep the pet warm.

The preferred mechanism to recharge the battery is a solar panel on the garment itself. Although a solar charger unit outside of the garment or a plug in wall charger outside the garment can be used to recharge said electrical source.

Other objects, features and advantages of the present invention will be apparent when the detailed description of the preferred embodiments of the invention are considered with reference to the drawings, which should be construed in an illustrative and not limiting sense.

BRIEF DESCRIPTION OF THE DRAWINGS

FIGS. 5A, 5B and 5C illustrate a lithium-polymer rechargeable battery showing rear, front and side view profiles;

FIG. 6 is a typical universal wall charger;

DETAILED DESCRIPTION OF THE INVENTION

In accordance with the present invention a heatable pet garment is provided comprising a garment covering the body of an animal with an opening for the head of the animal and at least two openings for the legs of the animal, preferably the front legs. A heat device is within the garment; a rechargeable electrical source to power the heat device; a mechanism to recharge the electrical source and a control unit to turn the electrical source on and off is included. When the heat device is activated heat is produced to warm the garment and the body of the animal.

The electrical source, which preferably is a rechargeable battery, is in electrical communication with the heat device, mechanism to recharge the electrical source and the control unit. The electrical communication is meant to refer to the wire connections and electrical flow between the components which are activated when desired.

The term animal as used in the specification herein refers to any pet or domesticated animal. The garment according to the invention is preferably used for dogs, but is not limited to such and may include any animal species.

In particular, the pet garments of the invention are preferably heated by solar power, i.e. solar panels and/or solar batteries, although other heat sources such as primary and secondary batteries, thermal, electric and microwave energy are included in the invention. An electrically heatable pet garment, either a sweater or coat, can help reduce the loss of a pet's core body heat.

In general the invention utilizes various methods and systems for using solar cells for heating pet clothing. In preferred embodiments, solar cells are integrated into a pet garment. The solar energy device, e.g. the plurality of solar cells, is an integral part of the garment.

According to at least one embodiment of the present invention, the clothing may have rechargeable batteries. The power generated from the solar cells can also directly power the operations of the device.

Figure 1A:
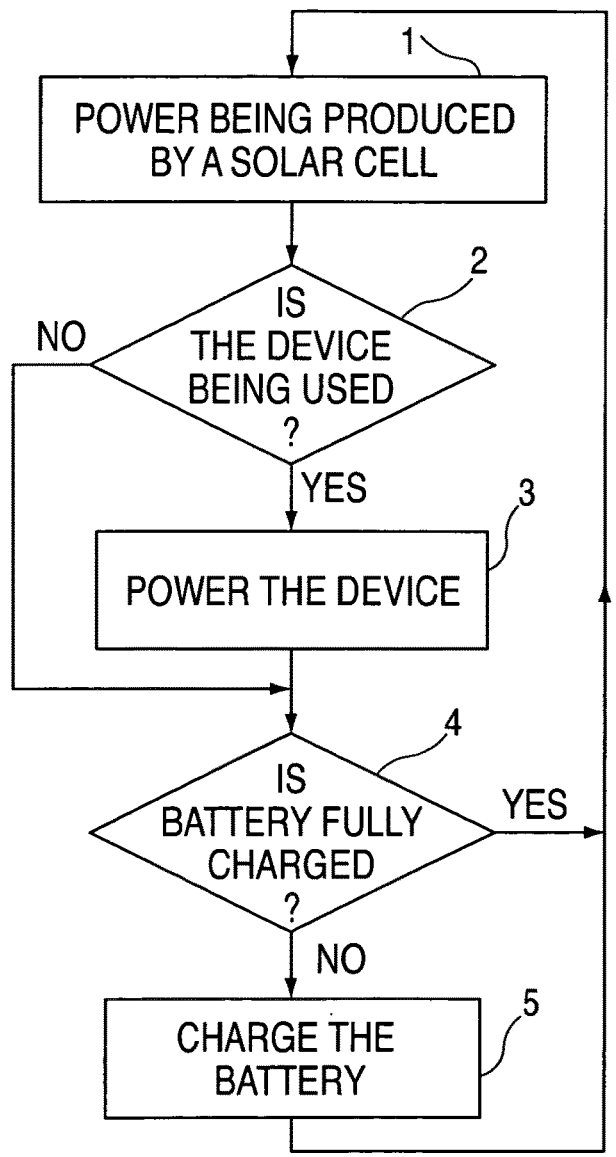
FIG. 1A is an illustration of the internal process of the power flow in a pet garment in accordance with the invention.

FIG. 1A is an illustration of the internal process of the power flow in a pet garment in accordance with the invention. The process starts when the solar cells are exposed to bright light and the solar cells generate electricity 1. When the device is being used 2, the instantaneous electric power 3 generated from the solar cells may be used to charge the batteries 5. Any leftover electricity after powering the device may also be used to charge the batteries 5.

Figure 1B:
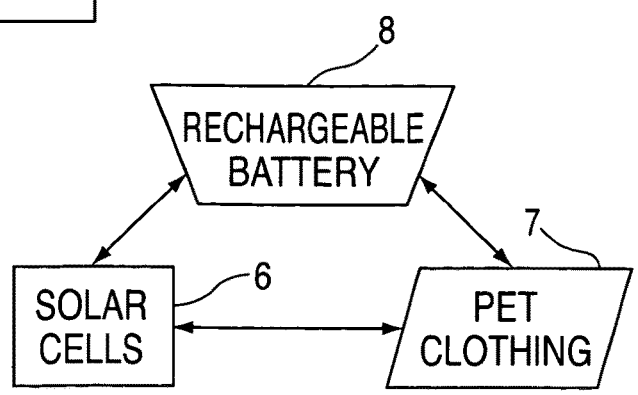
FIG. 1B illustrates the technology of the invention which uses solar cells to heat clothing for pets.

FIG. 1B illustrates the technology of the invention which uses solar cells 6 to heat clothing 7 for pets. Outfitted with a rechargeable battery 8, a heated pet garment can recharge itself on the fly.

In a preferred embodiment multiple solar cells are arranged on the surface of the device such that a number of solar cells are always functional and produce a desired voltage even if the rest are obstructed. Solar cells have been around for a number of years but their commercial use has been very limited. This is partly due to economic reasons. The cost of generating a unit amount of energy using currently available solar cell technologies is more expensive than using batteries. The efficiency of the solar cells and consumer awareness are also issues.

Solar power is a viable option in the present invention since the pet garments are designed to be used outdoors and are more suitable to be powered by solar energy. The garments are also preferably only used for short durations of 20 to 30 minutes at a time while walking an animal in cold weather.

An additional benefit of using renewable energies such as solar power is that they are "clean" and environmentally friendly. A solar cell is a device that converts light into electricity. Typically a solar cell comprises a light absorbing material, which is usually semi-conductor based. Many of the modern solar designs use crystalline silicon wafers or amorphous silicon films which are rigid. The phenomenon of converting light into electricity is called the photovoltaic effect. When light hits the solar cell and is absorbed by the photovoltaic material, the absorbed energy is converted to direct current (DC) electricity by separating negative and positive charges (e.g. electrons and holes) in the light-sensitive material. The generated DC electricity is then transmitted to the device, which consumes the electricity, through electrical contacts or transmission lines.

Basic Product Components

The basic components of the invention include the garment, the electrical source and modes, the charging mechanism, the control and the heat distribution method.

TABLE 1 below summarizes the components and general specifications of the heated pet clothing according to the invention. The specifications listed are meant to be illustrative of the invention, but is not limited to such.

TABLE 1

| AREA | TYPE | SPECIFICATIONS |
| --- | --- | --- |
| BATTERY CHARGING MECHANISM | THIN SOLAR PANEL CONNECTED TO RECHARGEABLE BATTERY SOLAR CHARGER UNIT PLUGS INTO RECHARGEABLE BATTERY PLUG-IN WALL CHARGER WITH PLUG-IN | Input: Direct Sun exposure Output: 5.7 V 112 mAh/350 MW 4 V 88 Ma Max Input: Direct Sun exposure Output: Rated 1.5-5 W Max Output .6 Watts Input: AC 100-240 Volts 50/60 HZ 0.8 amp Mzx |

TABLE 1-continued

| AREA | TYPE | SPECIFICATIONS |
|---|---|---|
| BATTERY | RECHARGEABLE BATTERY RECHARGEABLE LITHIUM ION | Output: DC 8.4 V-1.2 A Power: Minimum 3.7+ Volts/1 or 2 C Amps: Minimum 1300+ mAh/2 amp max discharge |
| BATTERY LOCATIONS | IN GARMENT: RECHARGED BY SOLAR PANEL IN GARMENT: RECHARGED BY PLUG-IN WALL CHARGER IN LEASH: CONNECTED TO SOLAR RECHARGER UNIT | |
| CONTROL/ADJUST TEMPERATURE | ON/OFF SWITCH ON/OFF SNAP/VELCRO ON/OFF WITH TWO HEATING LEVELS | |
| TYPES OF HEATING | CARBON CELL PADS | AC 100-240 Volts 50/60 HZ 0.8 amp Mzx Rating 80Deg C./150 V-Resistance 10-10,000 ohm/m |
| | CARBON CELL PANELS | Max. Temp. 82° F. 120-240 V Output 12 W PSF |
| | MICRO - FIBER OR WIRE | Rating 80° C., 150 V Resistance 10-10,000 ohm/m |
| | STANDARD REISTANCE WIRE | |
| HEATING TIME | SHORT DURATION ONE HOUR | 20 minute interval 3× per day Once a day |
| MAXIMUM TEMPERATURE | Not to exceed Dogs Body Temperature Other animals | 102 degrees Depends on animal |
| HEATING INSULATION | 3M Thinsulate Neoprine Fabric Liner | |

The Garment

Each Garment includes an electrical mode and heat distribution method to cover the pet's body. The garment is preferably made of a nylon type shell that is durable, windproof, water resistant. An example of such a material is Thinsulate® available from 3M. A wool interior lining is provided for the dogs comfort and further warmth.

Generally, the garment has an opening for the animals head and two openings for the front two legs. Garment options include adjustable side release Velcro® strips so that the garments can fit animals of different sizes and can be made to fit snugly. Also reflective strips can be included on the garments for safety when the garment is used at night or during foggy weather.

Electrical Source:

The electrical source for the pet garment of the invention can be from any of the following sources:
1. Solar panels which are positioned on garment to absorb sunlight.
2. Solar battery pack on the garment that stores any surplus power generated. The solar battery and the solar panel can be used together and/or separately.
3. Primary Battery (disposable)—which irreversibly transform chemical energy to electrical energy.
4. Secondary Batteries (rechargeable)—where their chemical reactions can be reversed by supplying electrical energy to the cell.
5. Energy created by movement (rechargeable watch)
6. Energy created by chemical reaction (i.e. Wonder Warmers)

The following are preferred electrical sources used in the invention power the heat device:
1. A solar panel which directly creates electricity for immediate heat conversion;
2. A solar panel that charges a Li-ion battery pack which stores any surplus power generated for selective use;
3. A battery pack with plug-in charger and charging port; and
4. Rechargeable battery operation using a standard A-D type cell battery.

Solar Energy

The sun has produced energy for billions of years. Solar energy is the solar radiation that reaches the earth. Solar energy can be converted directly or indirectly into other forms of energy, such as heat and electricity. The major drawbacks (problems, or issues to overcome) of solar energy are: (1) the intermittent and variable manner in which it arrives at the earth's surface and, (2) the large area required to collect it at a useful rate.

Photovoltaic energy is the conversion of sunlight into electricity through a photovoltaic (PVs) cell, commonly called a solar cell. A photovoltaic cell is a non-mechanical device usually made from silicon alloys.

Sunlight is composed of photons, or particles of solar energy. These photons contain various amounts of energy corresponding to the different wavelengths of the solar spectrum. When photons strike a photovoltaic cell, they may be reflected, pass right through, or be absorbed. Only the absorbed photons provide energy to generate electricity. When enough sunlight (energy) is absorbed by the material (a semiconductor), electrons are dislodged from the material's atoms. Special treatment of the material surface during manufacturing makes the front surface of the cell more receptive to free electrons, so the electrons naturally migrate to the surface.

When the electrons leave their position, holes are formed. When many electrons, each carrying a negative charge, travel toward the front surface of the cell, the resulting imbalance of charge between the cell's front and back surfaces creates a voltage potential like the negative and positive terminals of a battery. When the two surfaces are connected through an external load, electricity flows.

The photovoltaic cell is the basic building block of a PV system. Individual cells can vary in size from about 1 cm (½ inch) to about 10 cm (4 inches) across. However, one cell only produces 1 or 2 watts, which isn't enough power for most applications. To increase power output, cells are electrically connected into a packaged weather-tight module. Modules can be further connected to form an array. The term array refers to the entire generating plant, whether it is made up of one or several thousand modules. As many modules as needed, can be connected to form the array size (power output) needed.

The performance of a photovoltaic array is dependent upon sunlight. Climate conditions (e.g., clouds, fog) have a significant effect on the amount of solar energy received by a PV array and, in turn, its performance. Most current technology photovoltaic modules are about 10 percent efficient in converting sunlight with further research being conducted to raise this efficiency to 20 percent.

Solar Panels

Figure 2A:
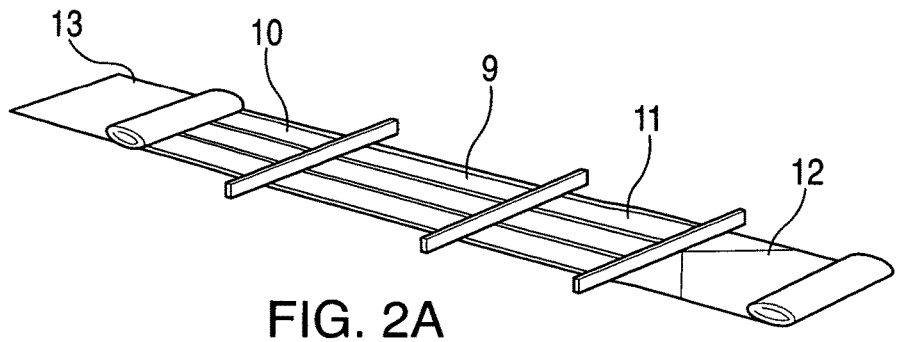
FIGS. 2A, 2B and 2C are illustrations of flexible solar panels used in the invention to recharge the battery.
Figure 2B:
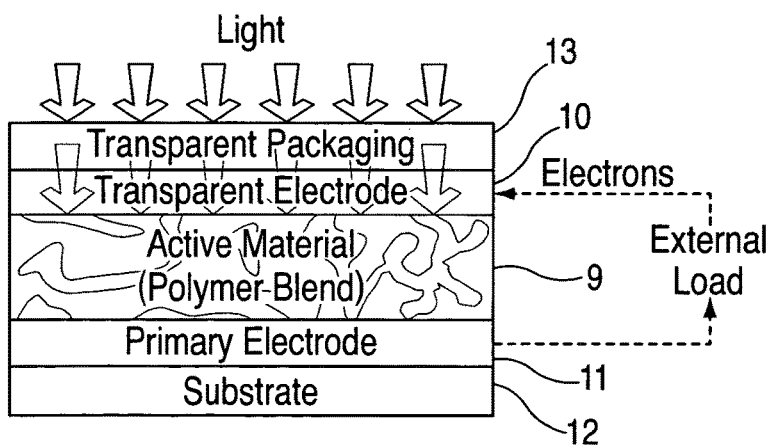
Figure 2C:
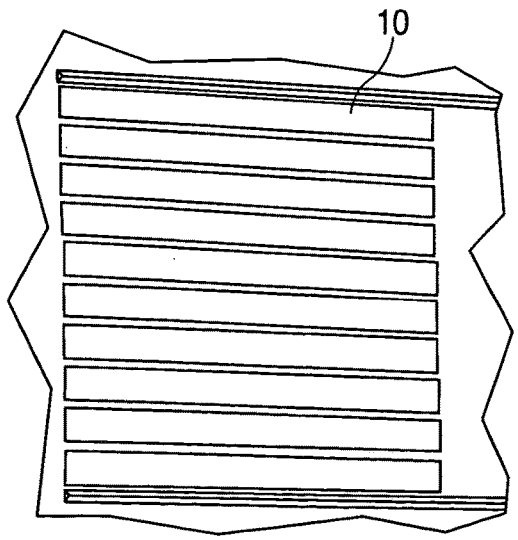

A variety of flexible solar panels can be used in the invention to recharge the battery. Examples are illustrated in FIGS. 2A, 2B and 2C. Specifically, FIG. 2A shows an angle view of a solar panel where the printed active material 9 absorbs photons to trigger the release of electrons which are then transported to the transparent electrode 10 to create electricity. The active material 9 is sandwiched between printed electrodes 11 which are sandwiched between the substrate 12 and the transparent packaging material 13. FIG. 2B shows an end view of the same solar panel indicating the flow of electrons from the primary electrode 11 to the transparent electrode 10.

FIG. 2C shows a commercially available flexible solar panel, PowerFilm R15-300 available from Konarka, Massachusetts. In the material the printed active material 10 is readily visible.

Figure 3:
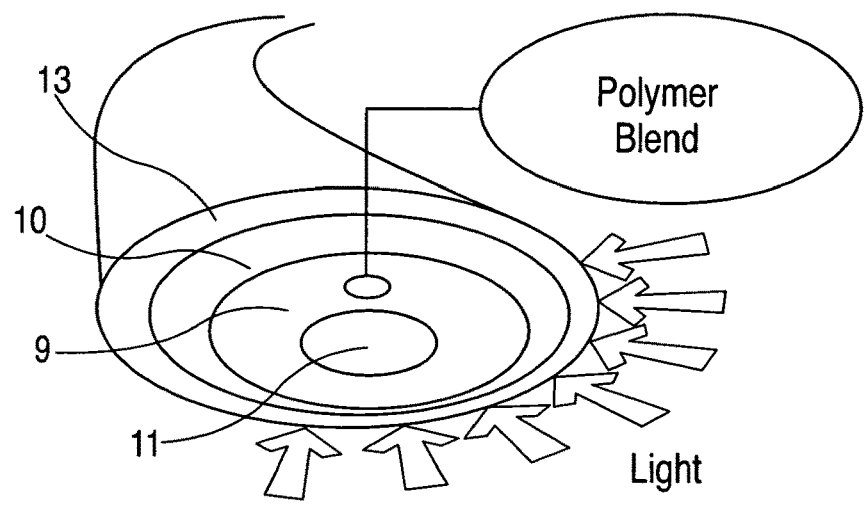
FIG. 3 shows a cross section of Power Fiber™.
Figure 4:
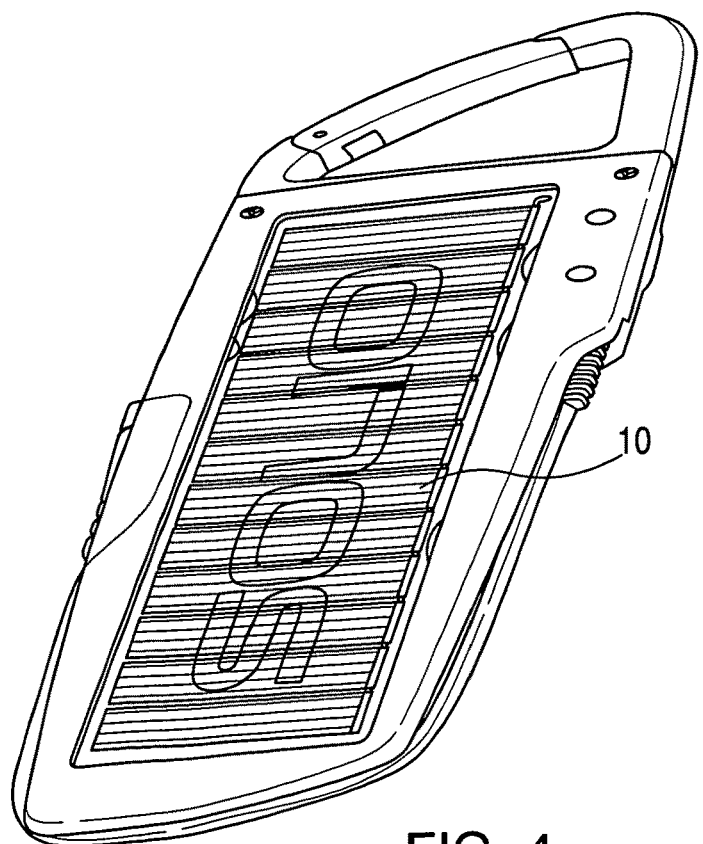
FIG. 4 shows a front view of a solar battery in accordance with the invention.

Other solar technology that may be incorporated into the pet garment of the invention include Power Fiber™ from Konarka, Massachusetts, illustrated in FIG. 3 and a Universal Solar battery available from Solio illustrated in FIG. 4.

FIG. 3 shows a cross section of the Power Fiber™ consisting of an inner core primary electrode 11 an active material 9 made of a polymer blend which is surrounded by a transparent electrode 10 and then the transparent packaging 13. The Power Fiber™ is seamlessly weaves photovoltaic material into the fabric. There is no substrate the fiber itself is considered the substrate so an additional support is not necessary. Rather than being layered onto a plastic substrate, the Power Fiber™ is made by coating the primary electrode with consecutive layers of active material, the transparent electrode, and the transparent packaging. Fabrics will have the same looks and feel while being able to produce power.

FIG. 4 shows a front view of the solar battery and the active material 10.

Other sample solar panels that may be used in the invention include the PowerFilm™ WeatherPro™ Flexible Solar Panel.

These PowerFilm™ panels allow trickle-charging of car, marine and auxiliary battery systems with solar power. It can be as easy as plugging one of our modules into a receptacle or hardwiring and mounting the panels on to a roof, canvas flap, or molding.

Mounted flexible or rigid, these modules can survive the hot and cold extremes of permanent outdoor use environments. PowerFilm™ modules are excellent for remote power applications such as sensors and transmitters and, in some situations, as a total substitute for batteries.

Solar Charging and Converting Unit

The solar charging and converting unit used in the invention may include The Voltaic™ solar bags and solar backpacks. These are mobile power generators, designed to charge your devices using solar energy without tying you to a power outlet, which makes them perfect for traveling. Just plug your standard 12V car lighter cord from your device into the solar backpack and recharge most small electronics including: cell phones, cameras, two way radios, iPods, GPS, PDAs, and MP3s.

Embedded in the outside of the bags are three lightweight, tough, waterproof solar panels which generate up to 4 Watts of power. This means quicker charge times!

Inside each bag is a Li-ion battery pack that stores any surplus power generated, so it is available when you need it—not just when the sun is up. The battery pack can also be charged using an AC travel charger or car charger (both included). This makes the Voltaic™ solar backpacks and solar bags just as useful on the grid as off.

Solar Converters Inc. manufacturers Constant Voltage Regulators which converts variable lower voltages to constant higher voltages.

These products take a variable lower voltage, typically a lower voltage battery and increase the voltage to a fixed higher voltage. They also can be adjusted to take a solar panel input.

Originally designed to operate pumps at a fixed voltage as the battery discharges, they are also used to maintain a constant voltage on electronics sensitive to voltage fluctuations as well as a means of charging a higher voltage battery from a lower voltage battery or solar panel with MPPT.

Batteries

The lithium polymer battery (Li-polymer) is preferred in the present invention and differentiates itself from other battery systems in the type of electrolyte used. The original design, dating back to the 1970's, uses a dry solid polymer electrolyte. This electrolyte resembles a plastic-like film that does not conduct electricity but allows an exchange of ions, electrically charged atoms or groups of atoms. The polymer electrolyte replaces the traditional porous separator, which is soaked with electrolyte. The dry polymer design offers simplifications with respect to fabrication, ruggedness, safety and thin-profile geometry. There is no danger of flammability because no liquid or gelled electrolyte is used. With a cell thickness measuring as little as one millimeter (0.039 inches), equipment designers are left to their own imagination in terms of form, shape and size. Unfortunately, the dry Li-polymer suffers from poor conductivity. Internal resistance is too high and cannot deliver the current bursts needed for modern communication devices and spinning up the hard drives of mobile computing equipment. Heating the cell to 60° C. (140° F.) and higher increases the conductivity but this requirement is unsuitable for portable applications. To make a small Li-polymer battery conductive, some gelled electrolyte has been added. Most of the commercial Li-polymer batteries used today for mobile phones are a hybrid and contain gelled electrolyte. The correct term for this system is Lithium Ion Polymer. For promotional reasons, most battery manufacturers mark the battery simply as Li-polymer. This hybrid lithium polymer is the only functioning polymer battery for portable use today.

FIGS. 5A, 5B and 5C illustrate a lithium-polymer rechargeable battery and show rear view, front view and side view profiles, respectively. Lithium-ion polymer batteries are preferred in the invention and provide a number of advantages including:

Very low profile—batteries are thin and light and can resemble the profile of a credit card.

Flexible form factor—manufacturers are not bound by standard cell formats. With high volume, any reasonable size can be produced economically.

Light weight—gelled rather than liquid electrolytes enable simplified packaging, in some cases eliminating the metal shell.

Improved safety—the batteries are resistant to overcharge and less chance for electrolyte leakage making them safer for the invention application use.

The rechargeable batteries can be recharged a number of different ways including using a solar panel; being part of a solar charger (i.e. using the Solio Universal charger) with a built-in internal battery; or attaching a typical universal wall charger as illustrated in FIG. 6.

Battery Energy

A battery is a device consisting of one or more electrochemical cells, which store chemical energy and make it available in an electrical form. There are many types of electrochemical cells, including galvanic cells, electrolytic cells, fuel cells, flow cells, and voltaic cells. Formally, an electrical "battery" is an array of similar voltaic cells ("cells") connected in series. However, in many contexts it is common to call a single cell a battery. A battery's characteristics may vary due to many factors including internal chemistry, current drain, and temperature.

There are two types of batteries, primary (disposable) and secondary (rechargeable), both of which convert chemical energy to electrical energy. Primary batteries can only be used once because they use up their chemicals in an irreversible reaction. Secondary batteries can be recharged because the chemical reactions they use are reversible; they are recharged by running a charging current through the battery, but in the opposite direction of the discharge current.

Batteries are Divided into Two Broad Classes:

Primary batteries irreversibly transform chemical energy to electrical energy. When the initial supply of reactants is exhausted, energy cannot be readily restored to the battery by electrical means. Not designed to be rechargeable—sometimes called "primary cells". "Disposable" may also imply that special disposal procedures must take place for proper disposal according to regulation, depending on battery type:

Zinc-carbon battery: mid cost, used in light drain applications

Zinc-chloride battery: similar to zinc carbon but slightly longer life

Alkaline battery: alkaline/manganese "long life" batteries widely used in both light-drain and heavy-drain applications Silver-oxide battery: commonly used in hearing aids, watches and calculators Lithium Iron Disulphide battery: commonly used in digital cameras. Sometimes used in watches and computer clocks. Very long life (up to ten years in wristwatches) and capable of delivering high currents but expensive. Will operate in sub-zero temperatures.

Lithium-Thionyl Chloride battery: is used in industrial applications, including computers, electric meters and other devices which contain volatile memory circuits and act as a "carryover" voltage to maintain the memory in the event of a main power failure. Other applications include providing power for wireless gas and water meters. The cells are rated at 3.6 Volts and come in 1/2AA, AA, 2/3A, A, C, D & DD sizes. They are relatively expensive, but have a proven ten-year shelf life.

Mercury battery: formerly used in digital watches, radio communications, and portable electronic instruments, manufactured only for specialist applications due to toxicity Zinc-air battery: commonly used in hearing aids Thermal battery: high-temperature reserve. Almost exclusively military applications.

Water-activated battery: used for radiosondes and emergency applications

Nickel Oxyhydroxide battery: Ideal for applications that use bursts of high current. Better performance and cheaper in this application than Lithium Iron Disulphide.

Paper battery: In August 2007, a research team at Rensselaer (led by Drs. Robert Linhardt, Pulickel M. Ajayan, and Omkaram Nalamasu) developed a paper battery with aligned carbon nanotubes, designed to function as both a lithium-ion battery and a supercapacitor, using ionic liquid, essentially a liquid salt, as electrolyte. The sheets can be rolled, twisted, folded, or cut into numerous shapes with no loss of integrity or efficiency, or stacked, like printer paper (or a voltaic pile), to boost total output. As well, they can be made in a variety of sizes, from postage stamp to broadsheet. Their light weight and low cost make them attractive for portable electronics, aircraft, and automobiles, while their ability to use electrolytes in blood make them potentially useful for medical devices such as pacemakers. In addition, they are biodegradable, unlike most other disposable cells.

Secondary batteries can be recharged, that is, have their chemical reactions reversed by supplying electrical energy to the cell, restoring their original composition:

Nickel-cadmium battery (NiCd): Best used for motorized equipment and other high-discharge, short-term devices. NiCd batteries can withstand even more drain than NiMH; however, the mAh rating is not high enough to keep a device running for very long, and the memory effect is far more severe.

Nickel-metal hydride battery (NiMH): Best used for high-tech devices. NiMH batteries can last up to four times longer than alkaline batteries because NiMH can withstand high current for a long while.

Rechargeable alkaline battery: use similar chemistry to non-rechargeable alkaline batteries and best suited for similar applications, but hold their charge for years, unlike NiCd and NiMH batteries.

Flow batteries are a special class of rechargeable battery where additional quantities of electrolyte are stored outside the main power cell of the battery, and circulated through it by pumps or by movement. Flow batteries can have extremely large capacities and are used in marine applications and are gaining popularity in grid energy storage applications.

Zinc-bromine and vanadium redox batteries are typical examples of commercially available flow batteries.

Heating Devices

The invention provides three heating device embodiments which can be used in the garment. They include carbon heating pads; traditional wire and carbon fiber wire.

Figure 7A:
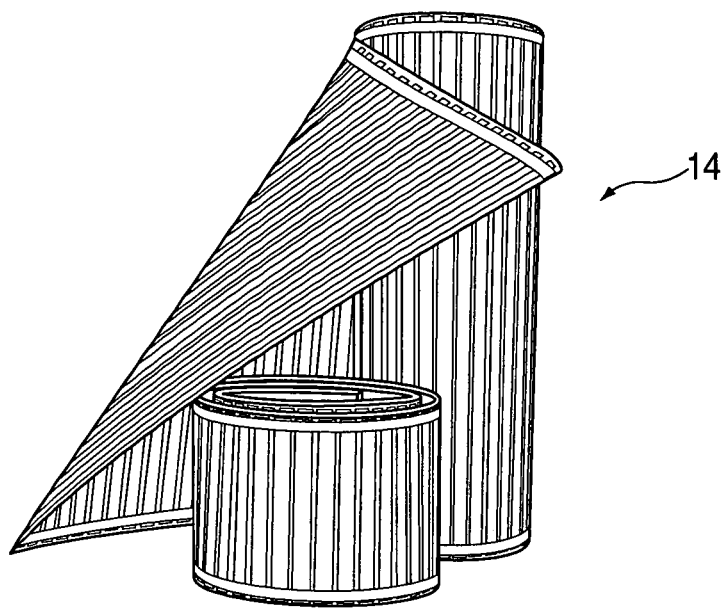
FIGS. 7A and 7B illustrate a carbon fiber roll and carbon heating pad, respectively, powered by a solar panel [not illustrated]
Figure 7B:
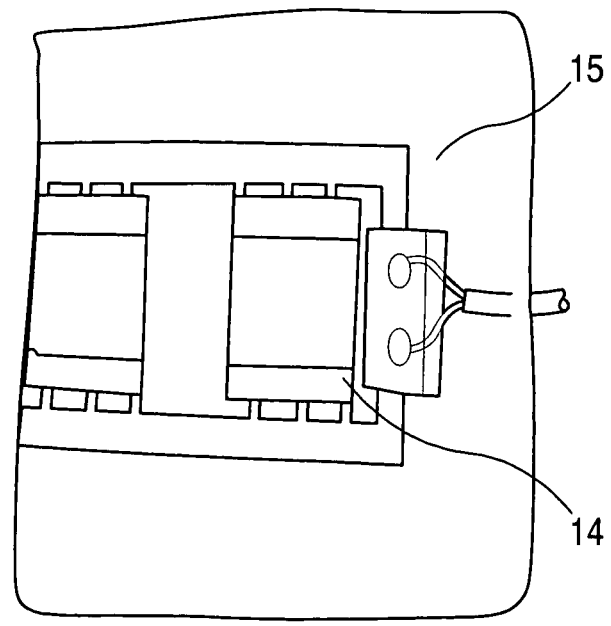
Figure 8A:
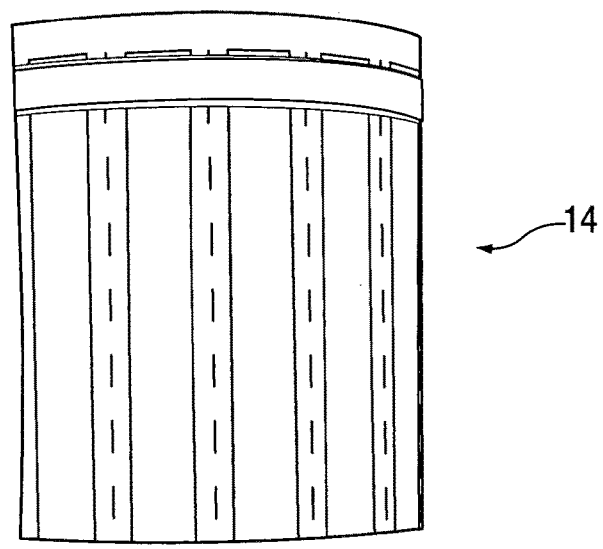
FIGS. 8A and 8B illustrate another carbon fiber roll and heating pad, respectively, powered by a solar panel [not illustrated] that can be used in the invention.
Figure 8B:
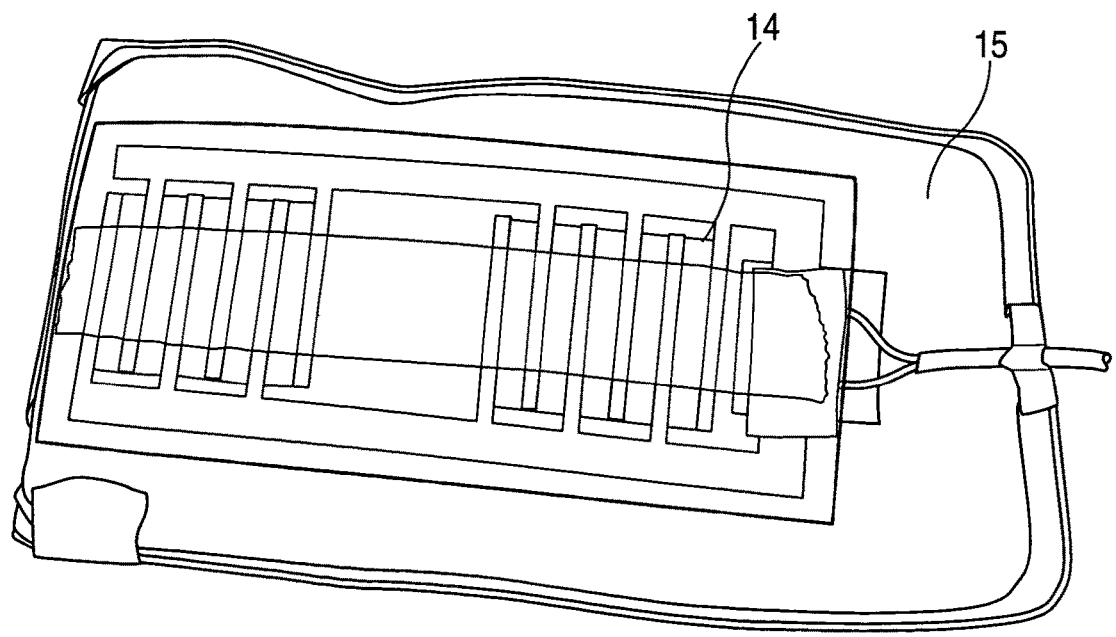

FIGS. 7A and 7B and FIGS. 8A and 8B illustrate two carbon fiber rolls and different carbon heating pads which are powered by solar panels. Specifically, FIGS. 7A and 8A show the carbon fiber rolls 14 and FIGS. 7B and 8B show the carbon fiber rolls 14 inserted into the heating pad 15.

Figure 9:
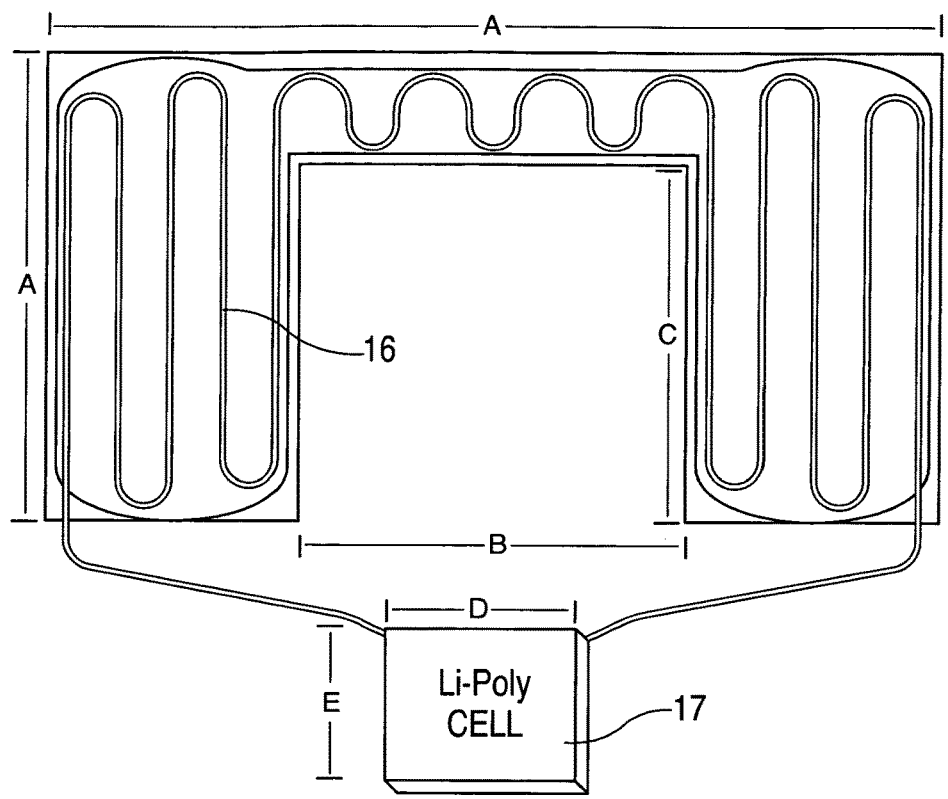
FIG. 9 illustrates a heated pattern with conventional wires that can be used in the invention.

Conventional wire can also be used in a heated blanket pattern as illustrated in FIG. 9. The resistance wire 16 is arranged in a pattern on the garment to provide warmth to the pet when in use. A rechargeable lithium polymer battery 17 powers the device. Preferred dimensions of the pad wiring pattern as illustrated in FIG. 9 are 12 inches in the A direction; 6 inches in the B direction; 9 inches in the C direction. The lithium polymer battery typically has a dimension 33.5 mm-95 mm-7 mm (D E F direction). These dimensions are for a pet garment that would fit a moderate size animal, preferably 12×6 inches. They can be modified to accommodate smaller or larger pets accordingly.

Figure 10:
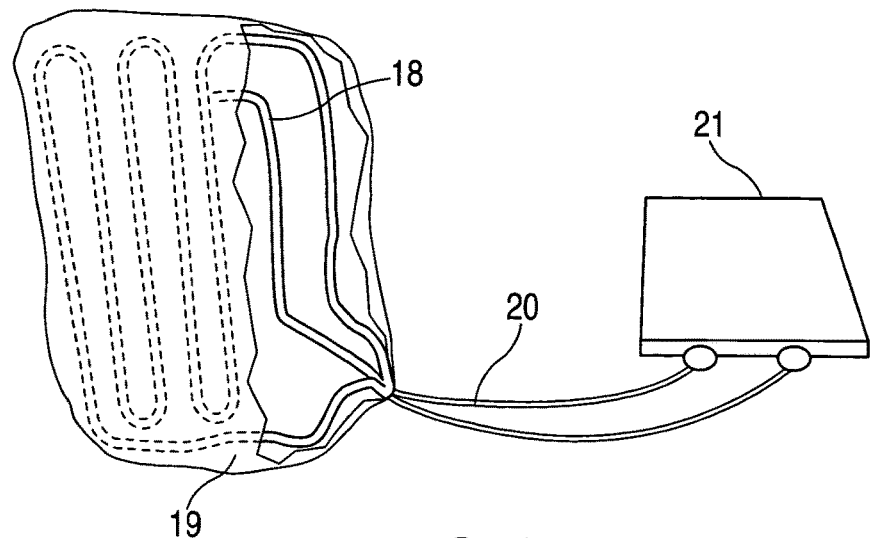
FIG. 10 shows a carbon heating pad with carbon fiber wire and traditional wire connected to the rechargeable battery.

Carbon fiber composite material products are currently available and formed by vacuum, press, RTM wrapping and other methods based on hand lay-up. The materials have been used in industries such as parts for automobiles and motorcycles, mining machinery, medical equipment. FIG. 10 shows the carbon fiber 18 which can be in the same pattern as illustrated in FIG. 9 as shown with the traditional resistance wire within the heated fabric pad 19. The carbon fiber wire 18 connects to traditional electrical wire 20 to connect to the battery 21.

Insulation

Figure 11:
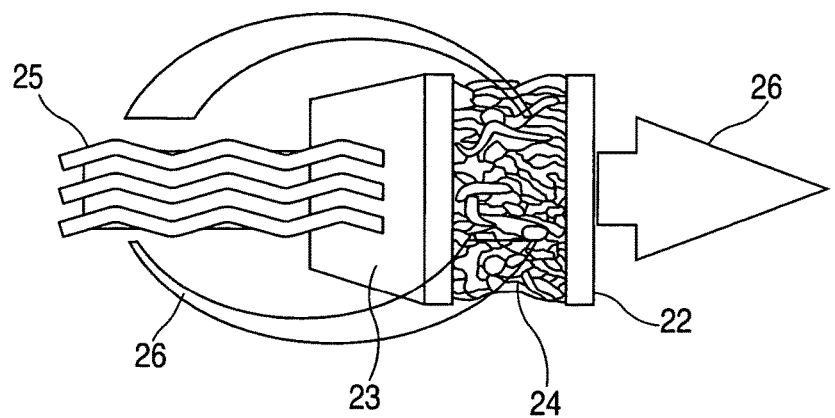
FIG. 11 is a schematic diagram showing the general properties of insulation.

The insulation of the invention garment can vary depending on the style but all embodiments insure that the heat is contained on the inside of the garment and protected from the cold outside. FIG. 11 illustrates the general properties of the insulation. The insulation 24 is sandwiched between the inner fabric lining 23 and outer shell 22. Radiant and conductive hear from the body 25 stays within the fabric lining 23 and keeps the animal warm, while the outer shell 22 permits moisture vapors 26 to escape keeping the animal dry. The entire system is thermally efficient.

The insulation provides superior warmth. It is soft and breathable so that the user remains comfortable. It has high durability even after rugged use and repeated cleanings and it is effective in both dry and wet weather conditions.

Wire

Most typical wires can be used to make the following connections in the invention device: 1. the solar panel to the battery; 2. from the battery to the on/off power switch; and 3. from the power switch to the heating panel.

Figure 12A:
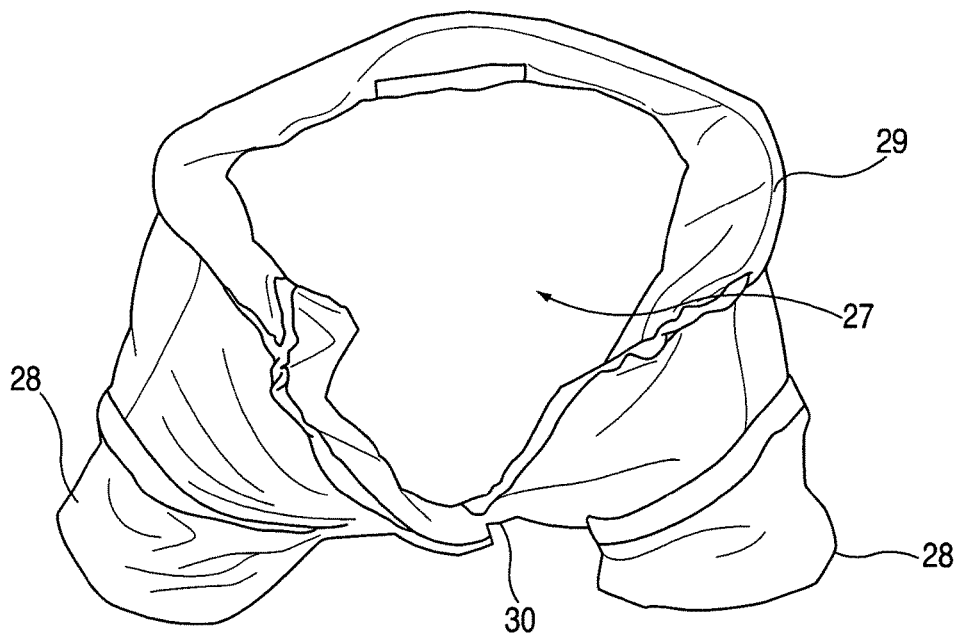
FIGS. 12A and 12B show a front view and a side view, respectively of the pet garment alone.
Figure 12B:
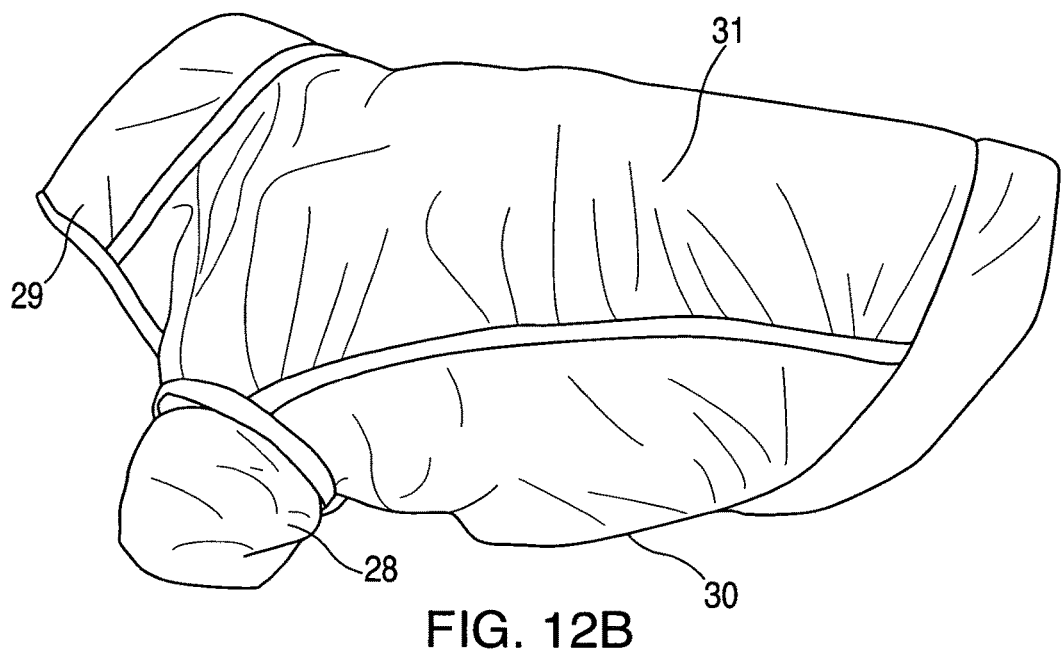

FIGS. 12A and 12B show a front view and side view, respectively of the garment alone. In general the garment includes an opening 27 for the head of the animal and at least two leg portions 28 for insertion of the front legs of the pet. The collar area 29 and underbelly portion 30 provide protection to the animal. From the side view the back side 31 of the garment is shown where the solar panel used in the invention is preferably located.

Figure 13A:
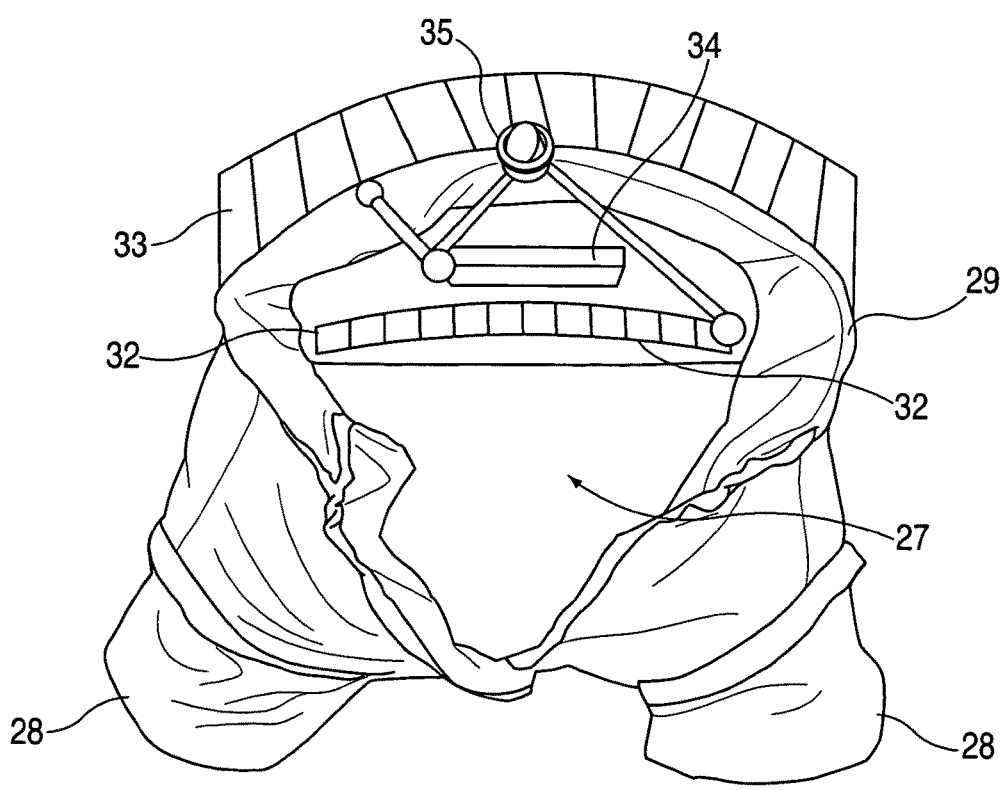
FIGS. 13A and 13B show a front view and a side view, respectively of the pet garment according to the invention.
Figure 13B:
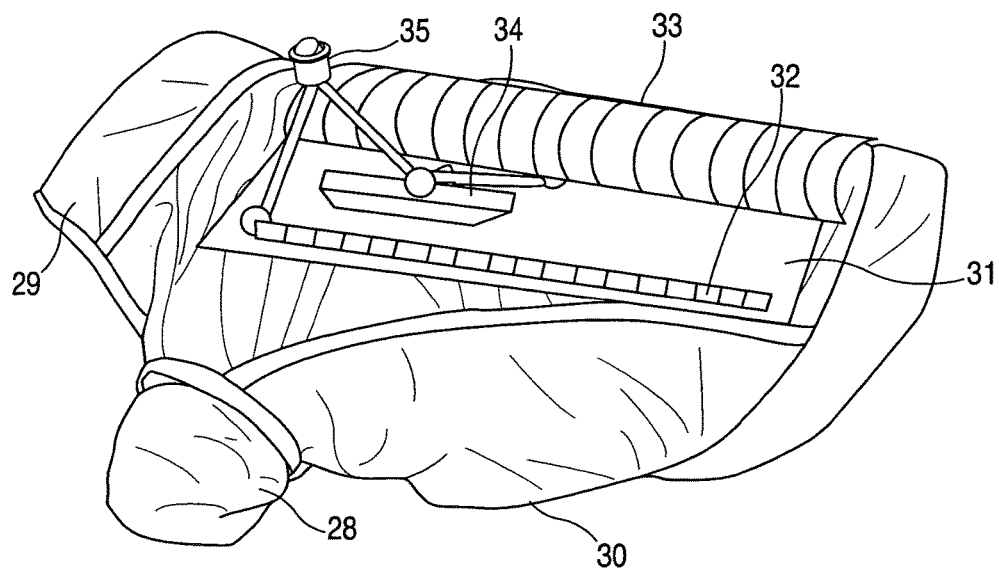

FIGS. 13A and 13B show a front and side view, respectively of the garment according to the invention including the solar panel 33, battery 34, heated panel 32 and wiring. The illustration shows the heated panel 32 on the inner portion of the garment, the solar panel 33 on the backside 31 of the garment. The battery 34 and power switch 35 in this embodiment are also on the garment itself on the backside 31, although in other embodiments these components can be outside of the garment.

Figure 14:
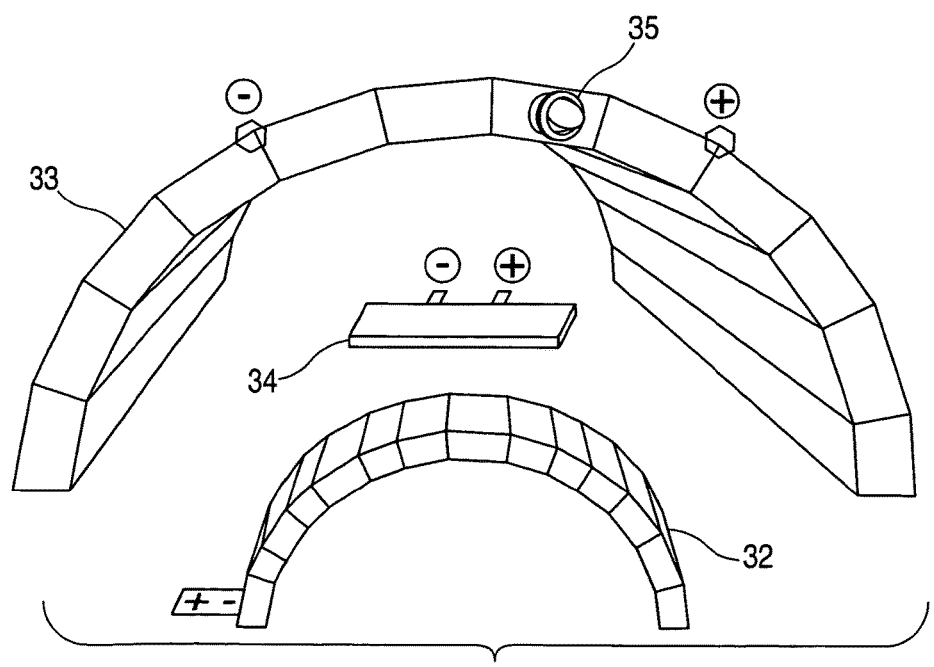
FIG. 14 illustrates the main components of the invention.

FIG. 14 illustrates the main components of the invention: the heated panel 32, the solar panel 33, the battery 34 and the switch 35, separated from the garment.

Figure 15A:
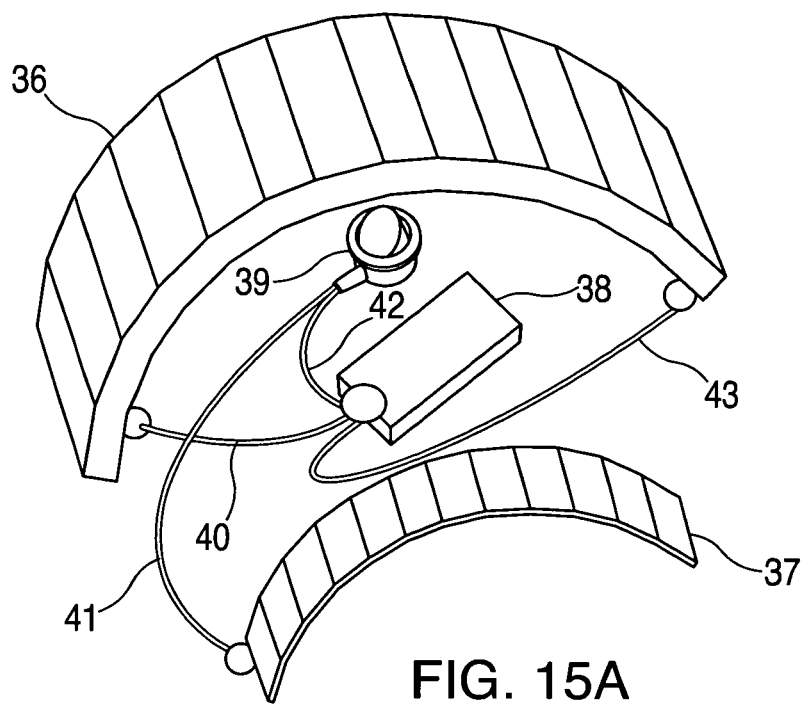
FIG. 15A illustrates the front view of the components of the garment showing the wiring of the garment.
Figure 15B:
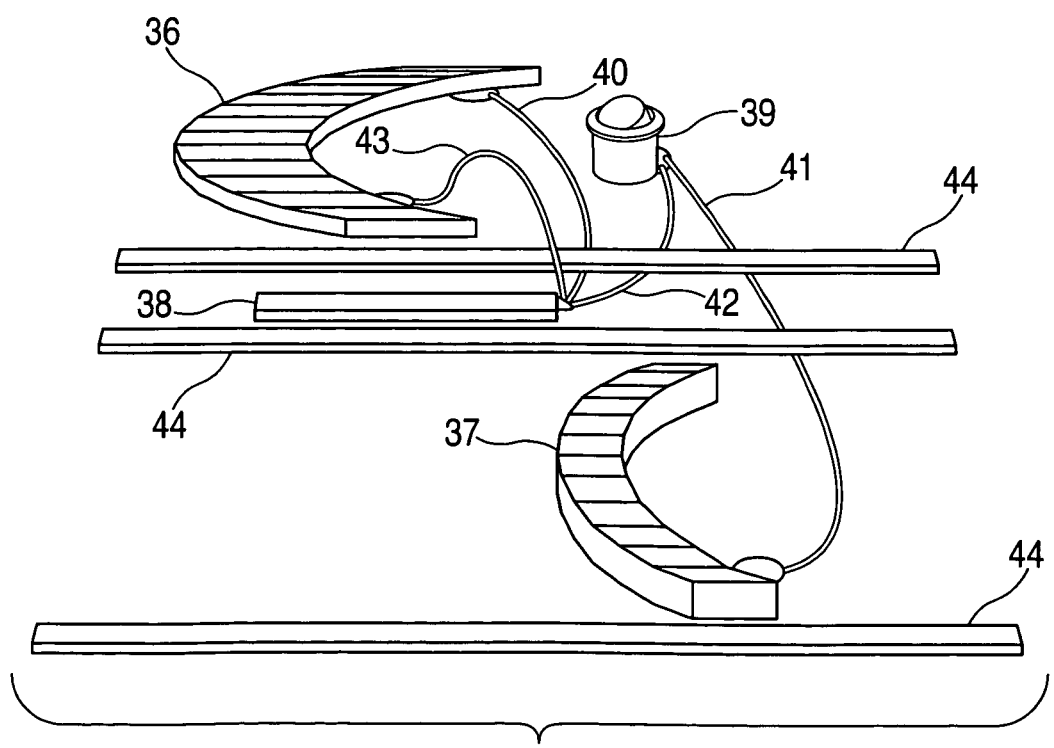
FIG. 15B illustrates a side view of the garment showing insulation layers and wiring as described in FIG. 15A.

FIG. 15A illustrates a front view of the components of the garment showing the wiring of the garment. The solar panel 36 is connected to the battery 38 by wire 40. The heated panel 37 is connected to the power switch 39 by wire 41. Wire 42 connects the power switch to the battery and wire 43 connects the solar panel 36 to charge the battery 38. FIG. 15B illustrates a side view of the garment showing insulation layers 44 and wiring as described in FIG. 15A.

Figure 16A:
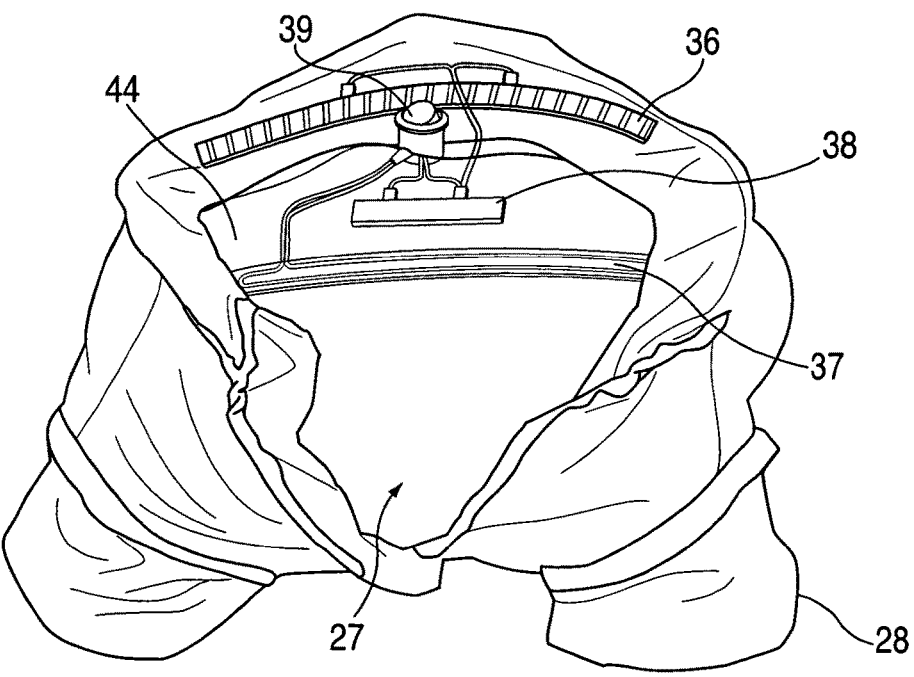
FIGS. 16A and 16B illustrate a front and side view, respectively, of the garment according to the invention showing the components, insulation layers and wiring.
Figure 16B:
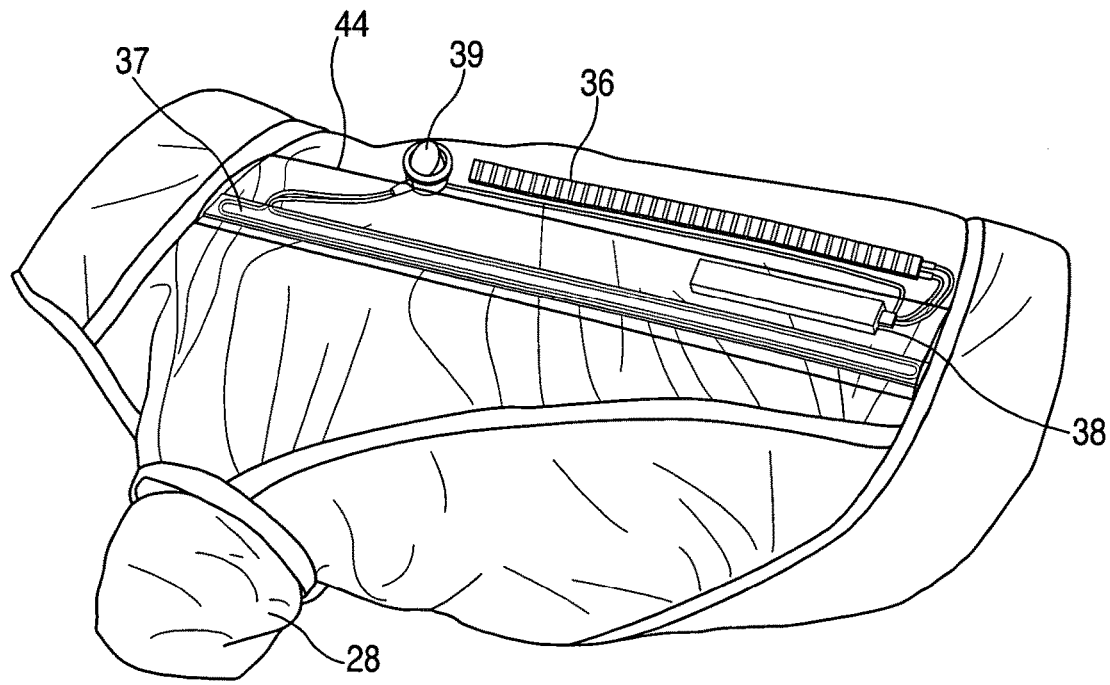

FIGS. 16A and 16B illustrate a front view and side view, respectively, of the garment according to the invention showing the components, insulation layers and wiring. The solar panel 36, switch 39, battery 38, heated panel 37 and protective layer 44 are shown. The head opening 27 and the leg openings 28 are also illustrated.

Figure 17A:
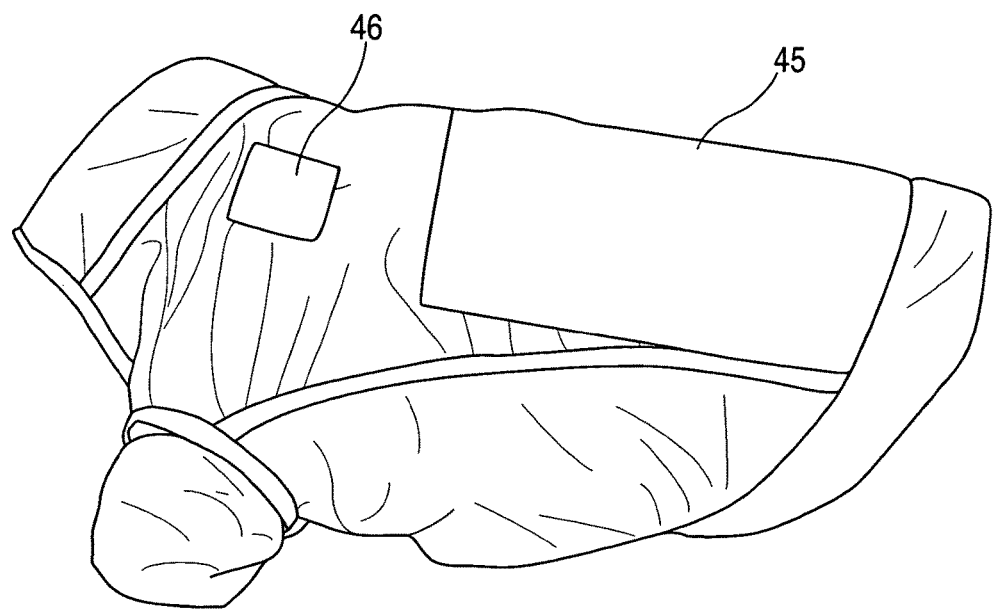
FIGS. 17A, 17B, 17C and 17D illustrate the component layers of the garment according to the invention.
Figure 17B:
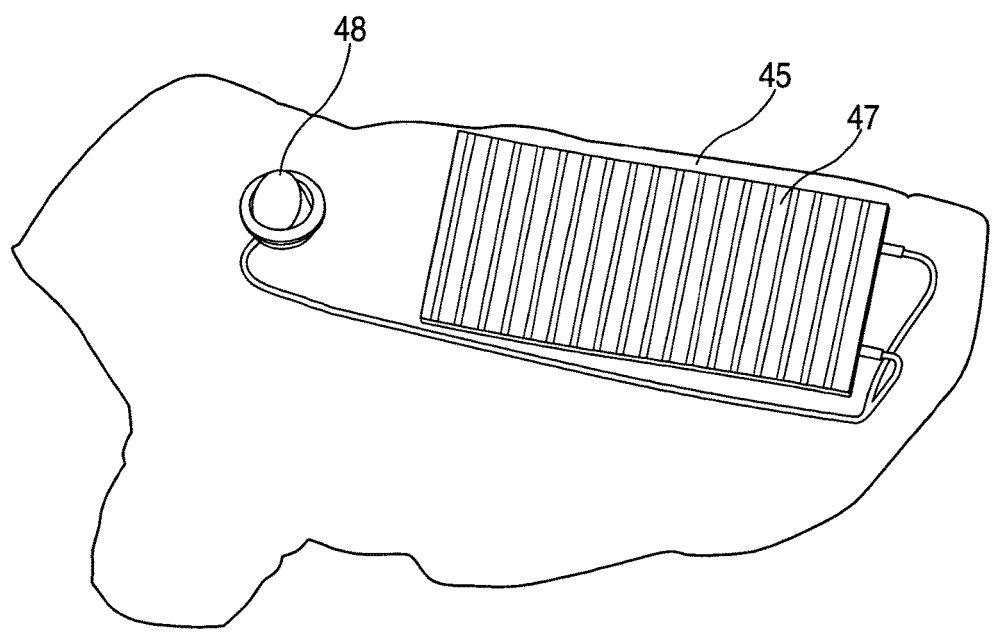
Figure 17C:
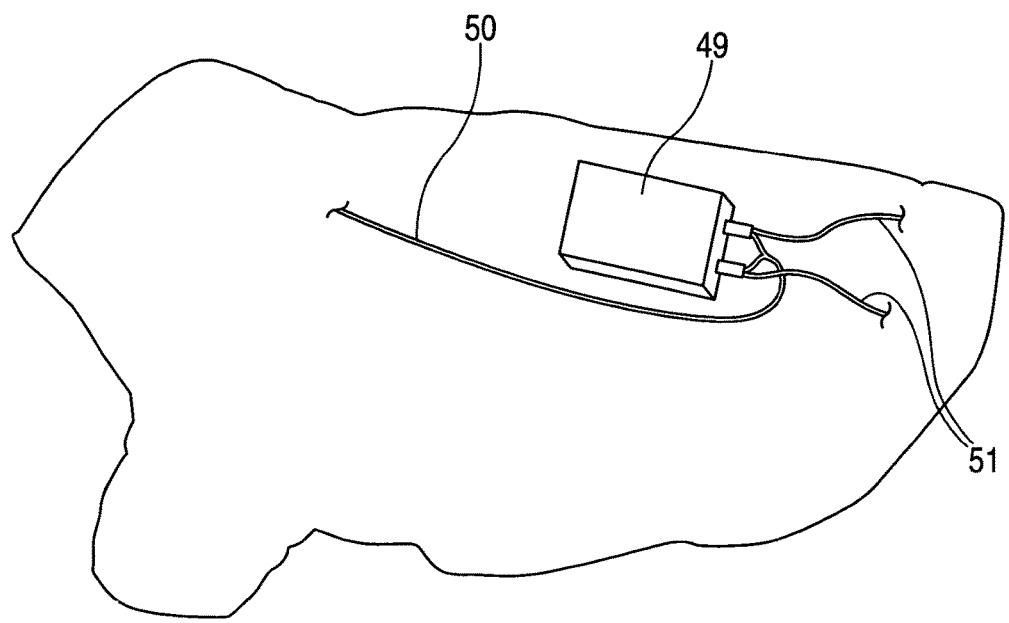
Figure 17D:
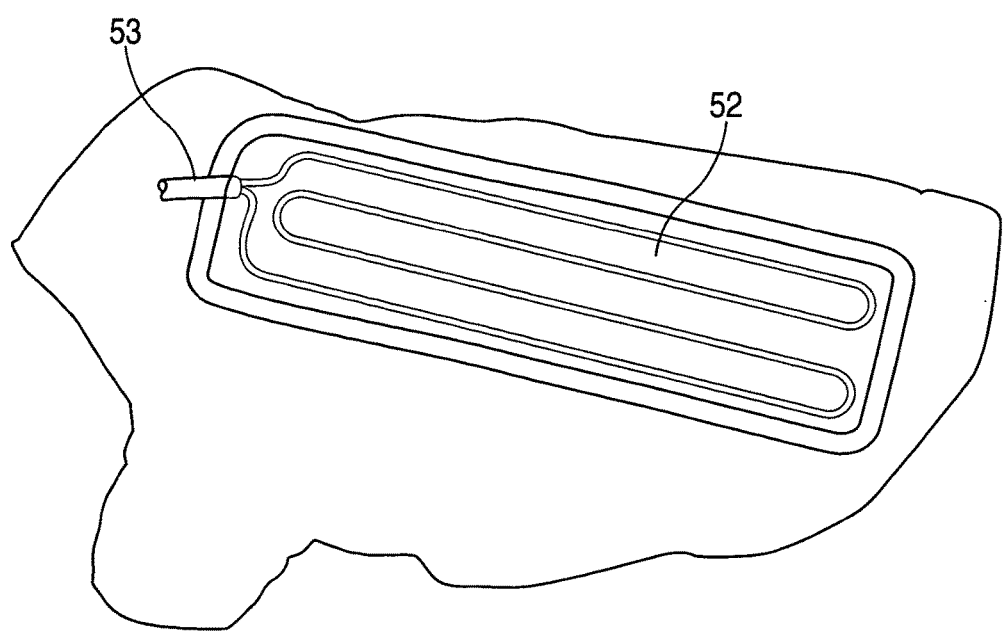

FIGS. 17A, 17B, 17C and 17D illustrate the component layers of the garment according to the invention. Specifically, FIG. 17A illustrates the top outermost layer of the garment showing the cut-out area for the solar panel 45 and switch 46. FIG. 17B illustrates the second layer with the solar panel 47 and switch 48. FIG. 17C illustrates the third layer of the garment showing the battery 49 and the wiring 50 to the switch and the wiring 51 to the solar panel. FIG. 17D illustrates the inner layer of the garment showing the heating pad 52 and the wiring 53 to the switch.

Figure 18A:
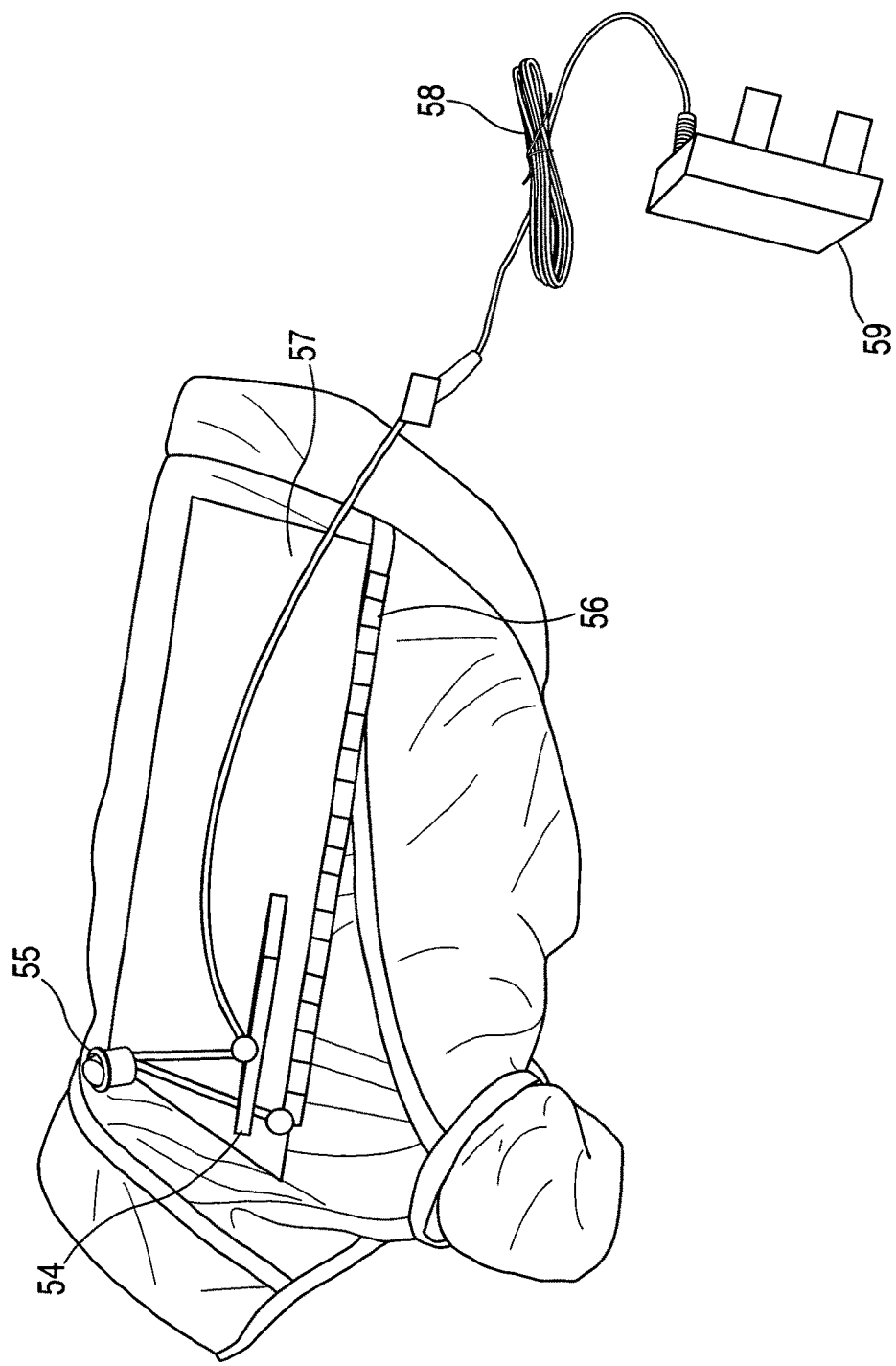
FIG. 18A illustrates a side view of the garment in the embodiment where a wall charger is used.

Alternative methods to charge the garment include charging the battery using a wall charger or using a portable solar charger. FIG. 18A illustrates a side view of the garment in the embodiment where a wall charger is used. The power switch 55 is connected to the rechargeable battery 54 and the heated panel 56. The charger wire 58 is connected to a power cord 59 which can be plugged into any outlet to recharge the battery. The protective insulation 57 of the garment is also shown.

Figure 18B:
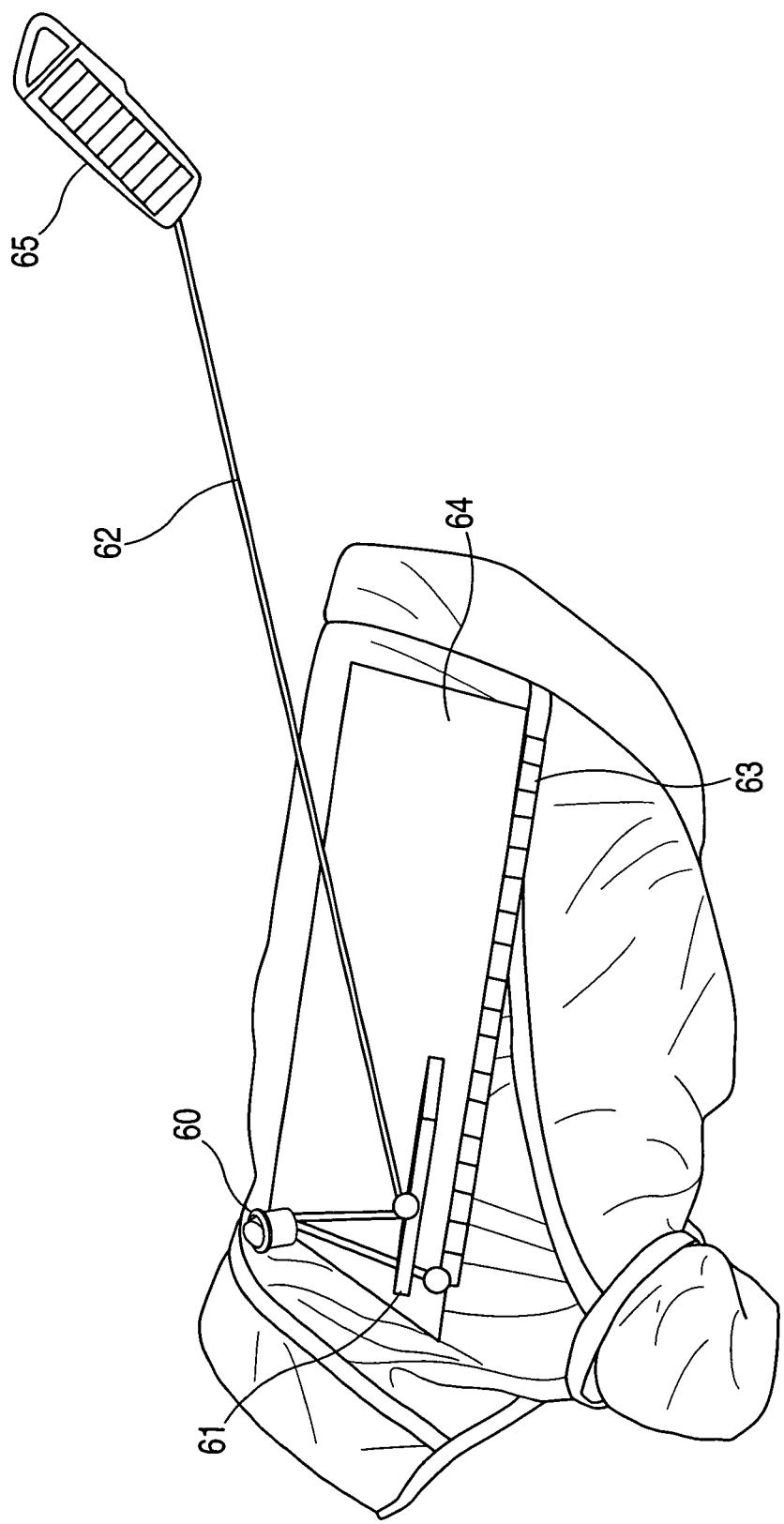
FIG. 18B illustrates the embodiment where a portable solar charger is used.

FIG. 18B illustrates a side view of the garment in the embodiment where a portable solar charger is used. The power switch 60 is connected to the rechargeable battery 61 and the heated panel 63. The solar charger power cord 62 is connects the battery 61 to a remote solar charger 65. The protective insulation 64 of the garment is also shown.

Control (On/Off) Unit

Many types of on/off switches, or control units, can be used in the invention device as long as they are rated for the proper current.

The invention garment is operated by a control on/off unit. In a preferred embodiment the unit is an on/off switch located on the garment itself. In another embodiment, it can be on the pet's leash with an on/off switch. In yet another embodiment, the on/off switch can be remote controlled unit.

The garment is structured so that the electrical sources power the heating elements that are woven into the garment which operate at such a low amperage so that it eliminates "all possibility of shock or burn, even when wet."

In an alternate embodiment the control unit can also be used to adjust the temperature of the garment.

The present invention will be illustrated in more detail by the following example without limiting the scope of the invention in any way.

Example 1

A pet garment according to the invention is prepared where a heat device is wired to a rechargeable electrical source within the garment. A solar panel is on the outer shell of the garment and is connected by wire to the electrical source which is a lithium polymer battery. The control unit is turned on powering the heat to produce heat to warm the garment. Carbon pads within the garment distribute the heat throughout the garment keeping the animal warm. In another embodiment, resistive wires sewn into the garment distribute the heat. However, it is within the scope of the invention for the heating elements to be distributed uniformly throughout the garment. The garment preferably stays warm for 20 to 30 minutes. When the heat device is turned off, energy absorbed by the solar panel recharges the battery for the next use.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A heatable pet garment comprised of: a one-piece heatable garment covering the body of an animal with an opening for the head of said animal and at least two openings for the legs of said animal; wherein the garment comprises an outer shell layer, a middle insulation layer and an inner fabric layer such that the inner fabric layer is in contact with the body of the animal; and including a self contained solar powered rechargeable circuit for heating the garment consisting of: a heat device embedded within said middle layer of said garment to produce heat to warm said garment; a non-disposable rechargeable electrical source to power said heat device embedded within said middle layer of said garment; at least one solar panel on the outer shell layer of said garment; and a power switch on the outer shell layer of said garment to turn said electrical source on and off; wherein said heat device, said rechargeable electrical source, said at least one solar panel and said power switch are all in electrical communication within the garment such that said heat device is connected via a first internal wire to said power switch, said at least one solar panel is connected via at least one second internal wire to said rechargeable electrical source; and said rechargeable electrical source is connected via a third internal wire to said power switch.

2. The heatable pet garment according to claim 1 wherein said heat device is selected from the group consisting of carbon heating pads, pads with resistance wire and pads with carbon fiber wire.

3. The heatable pet garment according to claim 1, wherein said rechargeable electrical source is a Li-ion battery pack which stores surplus power generated for selective use.

4. The heatable pet garment according to claim 1, wherein said rechargeable electrical source is a secondary A, B, C or D type cell battery.

5. The heatable pet garment according to claim 1, wherein said rechargeable electrical source is photoelectrochemical and is selected from the group consisting of photovoltaic (PV), thin film organic and printable type photovoltaics (TFPV), organic photoelectrochemical, dye sensitized cells.

6. The heatable pet garment according to claim 1, wherein said rechargeable electrical source is selected from the group consisting of kinetic energy, Infinit-e Stretcher and self powered twist devices.

7. The heatable pet garment of claim 1, wherein the garment comprises a back side portion and an underbelly portion and wherein said at least one solar panel is located on the back side portion and is absent from the underbelly portion.

8. A heatable pet garment comprised of: a one-piece heatable garment covering the body of an animal comprising a back side portion and an underbelly portion, wherein the garment further comprises at least two or more layers of internal protective insulation, and an outer layer of protective insulation; and including a self contained solar powered rechargeable circuit for heating the garment consisting of: a non-disposable rechargeable battery embedded within said internal protective insulation of the garment; a solar panel on said back side portion outer layer of protective insulation, in electrical communication with said battery and capable of recharging said battery; a heating mechanism embedded within said at least two or more layers of internal protective insulation of the garment, in electrical communication with said battery and in physical communication with the garment to produce heat to warm the garment; and a power control unit, embedded within the outer layer of protective insulation of the garment, in electrical communication with said battery and said heating mechanism to turn the heating mechanism on and off.

9. A heatable pet garment according to claim 8, wherein said heating mechanism is selected from the group consisting of carbon heating pads, pads with resistance wire and pads with carbon fiber wire.

10. A heatable pet garment according to claim 8, wherein said rechargeable battery is a lithium polymer battery.

11. A method to keep a pet warm comprising the steps of: providing a heatable pet garment, having no external wires, comprised of: a garment covering the body of the pet with openings for the head and at least two legs of the pet including an internal protective insulation layer and an outer protective insulation layer; and including a self contained solar-powered rechargeable circuit for heating the garment consisting of: a heat device embedded within the internal protective insulation layer of the garment; a non-disposable rechargeable electrical source embedded within the internal protective insulation layer of the garment used to power said heat device; a solar panel embedded within the outer protective insulation layer of the garment in electrical communication with said rechargeable electrical source; and a control unit embedded within the outer protective insulation layer of the garment, to turn said electrical source on and off; turning said control unit on to turn said electrical source on; powering said heat device to produce heat to warm the garment; and distributing the heat throughout the garment to keep the pet warm.

12. The method according to claim 11 wherein said heat device is selected from the group consisting of carbon heating pads, pads with resistance wire and pads with carbon fiber wire.

13. The method according to claim 11, wherein said rechargeable electrical source is a lithium polymer battery.

14. The method according to claim 11, wherein the garment comprises a back side portion and an underbelly portion and wherein said solar panel is located on the back side portion and is absent from the underbelly portion.

* * * * *